United States Patent
Huber et al.

(10) Patent No.: US 10,291,907 B2
(45) Date of Patent: May 14, 2019

(54) MULTI-VIEW DISPLAY CONTROL FOR CHANNEL SELECTION

(71) Applicant: TELEFONAKTIEBOLAGET LM ERICSSON (PUBL), Stockholm (SE)

(72) Inventors: Michael Huber, Täby (SE); Olof Ermis, Västerås (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 15/113,268

(22) PCT Filed: Jan. 23, 2014

(86) PCT No.: PCT/SE2014/050082
§ 371 (c)(1),
(2) Date: Jul. 21, 2016

(87) PCT Pub. No.: WO2015/112064
PCT Pub. Date: Jul. 30, 2015

(65) Prior Publication Data
US 2017/0013253 A1    Jan. 12, 2017

(51) Int. Cl.
*H04N 13/351* (2018.01)
*H04N 13/302* (2018.01)
(Continued)

(52) U.S. Cl.
CPC ......... *H04N 13/351* (2018.05); *H04N 13/156* (2018.05); *H04N 13/302* (2018.05);
(Continued)

(58) Field of Classification Search
CPC .. H04N 13/351; H04N 13/376; H04N 13/156; H04N 13/302; H04N 13/366; H04N 13/373; H04N 21/4316; H04N 21/44218
(Continued)

(56) References Cited

U.S. PATENT DOCUMENTS

| 7,450,188 B2 | 11/2008 | Schwerdtner |
| 2011/0164188 A1 | 7/2011 | Karaoguz et al. |

(Continued)

FOREIGN PATENT DOCUMENTS

| EP | 1703743 A1 | 9/2006 |
| EP | 2346021 A1 | 7/2011 |

(Continued)

OTHER PUBLICATIONS

International Search Report and Written Opinion dated May 27, 2014, in International Application No. PCT/SE2014/050082, 20 pages.
(Continued)

*Primary Examiner* — Nguyen T Truong

(74) *Attorney, Agent, or Firm* — Sage Patent Group

(57) ABSTRACT

A multi-view display device, including a controller that is operable to receive from a positioning device, position information representing positions of a left eye and a right eye of a viewer relative to the multi-view display. The viewer is able to activate a channel selection mode in which the multiview display simultaneously projects different stereoscopic channels on the side of his last position before starting the new mode, so he can see other channels by changing his head position. The viewer selects then a desired channel by which it ends the channel selection mode and switches the display to a mode where only one channel is stereoscopically displayed at a time.

23 Claims, 9 Drawing Sheets

(51) Int. Cl.
    *H04N 13/366*    (2018.01)
    *H04N 21/431*    (2011.01)
    *H04N 21/442*    (2011.01)
    *H04N 13/376*    (2018.01)
    *H04N 13/156*    (2018.01)
    *H04N 13/373*    (2018.01)

(52) U.S. Cl.
    CPC ......... *H04N 13/366* (2018.05); *H04N 13/373* (2018.05); *H04N 13/376* (2018.05); *H04N 21/4316* (2013.01); *H04N 21/44218* (2013.01)

(58) Field of Classification Search
    USPC .......................................................... 348/54
    See application file for complete search history.

(56) References Cited

U.S. PATENT DOCUMENTS

| | | |
|---|---|---|
| 2011/0310003 A1 | 12/2011 | de la Barré |
| 2013/0050196 A1 | 2/2013 | Takashima et al. |

FOREIGN PATENT DOCUMENTS

| | | |
|---|---|---|
| EP | 2365420 A2 | 9/2011 |
| EP | 2653906 A2 | 10/2013 |
| GB | 2499426 A | 8/2013 |

OTHER PUBLICATIONS

Hyemi Kim eta al. "Dual Autostereoscopic Display Platform for Multi-user Collaboration with Natural Interaction", ETRI Journal, vol. 34, No. 3, Jun. 1, 2012 (Jun. 1, 2012), pp. 466-469, XP055112925, ISSN: 1225-6463, DOI: 10.4218/etrij.12.0211.0331.

Al-Wabil et al. "Examining visual attention of dyslexics on web navigation structures with eye tracking" International Conference on Innovations in Information Technology, 2008. IIT 2008. Dec. 16-18, 2008, pp. 717-721.

Cornett "Eyetracking Metrics for Usability Studies" http://www.inspireux.com/2010/06/14/eyetracking-metrics-for-usability-studies/ Posted on Jun. 14, 2010, 4 pages.

Bulla et al. "Region of Interest Encoding in Video Conference Systems" MMEDIA 2013, the Fifth International Conferences on Advances in Multimedia, pp. 119-124, 2013.

Kortum et al. "Implementation of a foveated image coding system for bandwidth reduction of video images" SPIE Proceedings, vol. 2657, 1996, pp. 350-360.

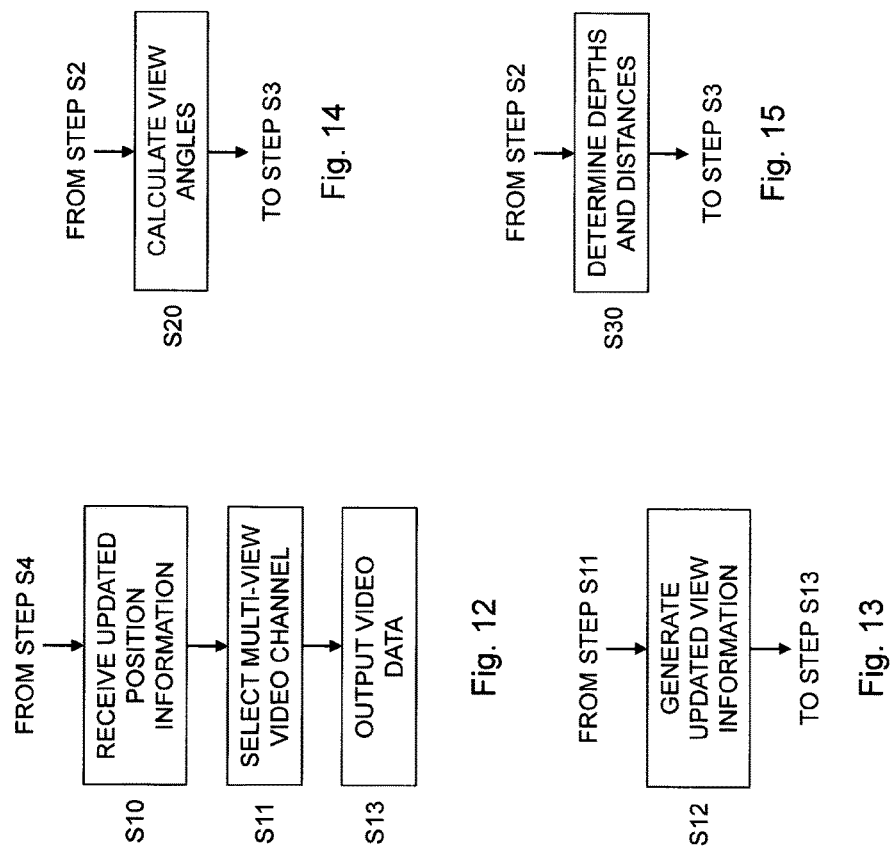

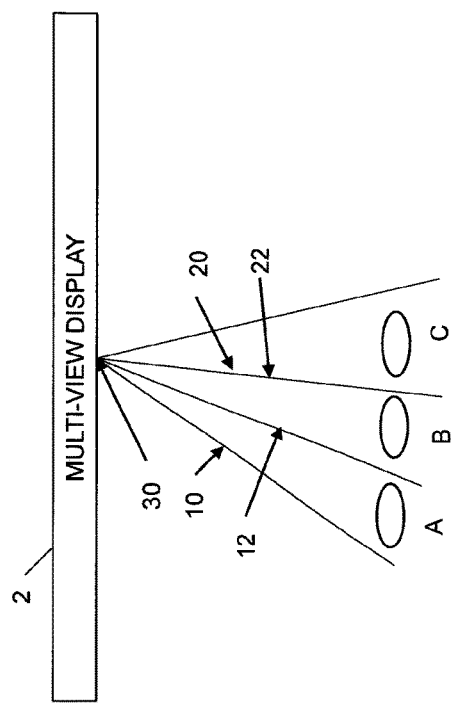
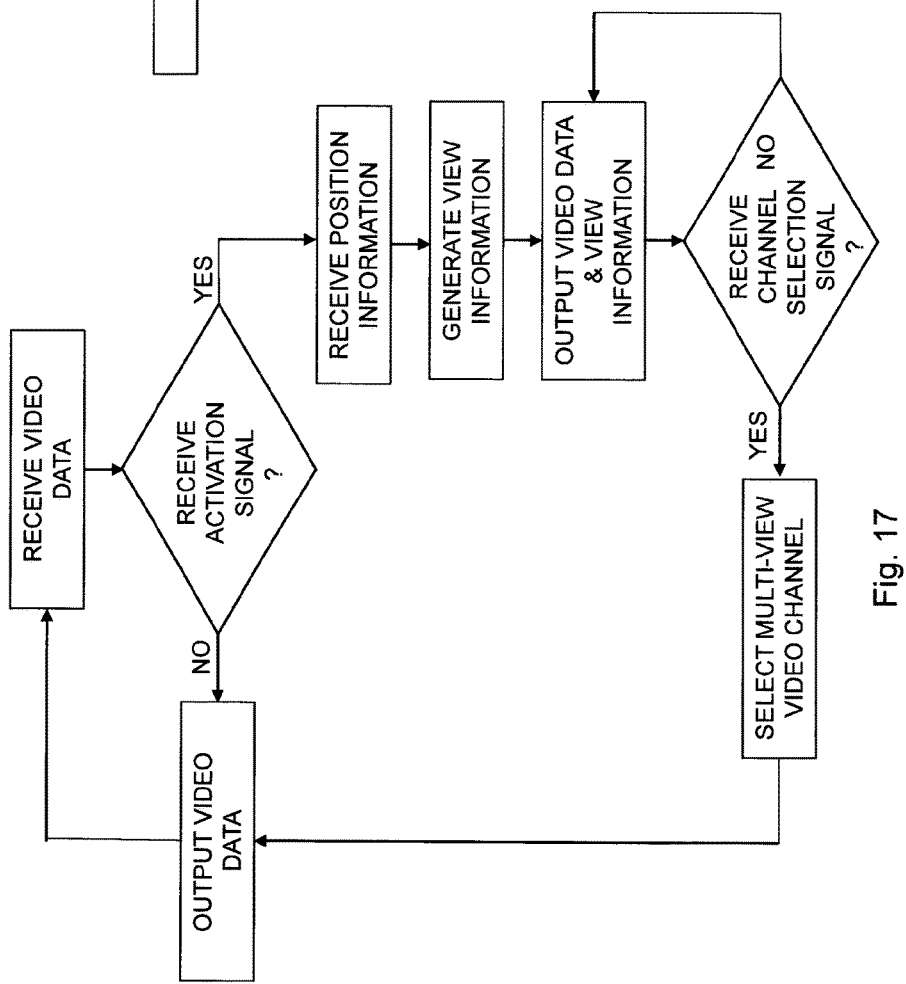
Fig. 21
Fig. 17

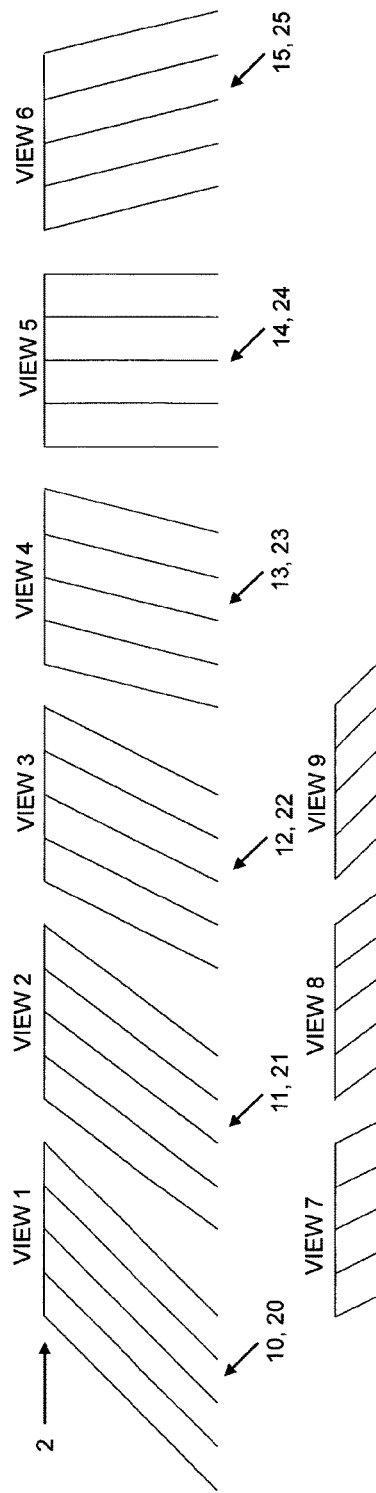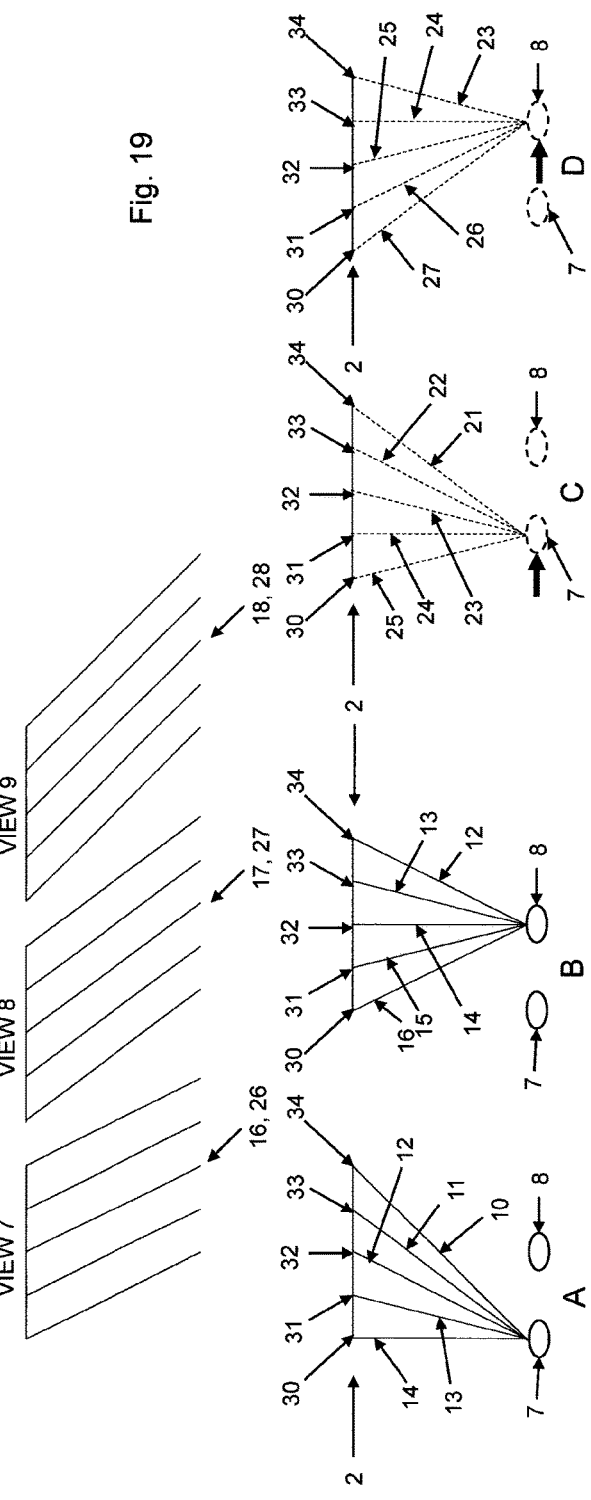
Fig. 19

MULTI-VIEW DISPLAY CONTROL FOR CHANNEL SELECTION

CROSS REFERENCE TO RELATED APPLICATION(S)

This application is a 35 U.S.C. § 371 National Phase Entry Application from PCT/SE2014/050082, filed Jan. 23, 2014, designating the United States, the disclosure of which is incorporated herein in its entirety by reference.

TECHNICAL FIELD

The present embodiments generally relate to multi-view display control, and in particular to controlling channel selection of multi-view video channels.

BACKGROUND

3D TV systems that are on the market today are typically stereo-based: one image is presented to the left eye and another to the right eye. There are several ways to achieve this effect. For instance, polarizing filters can be used on every second row of the TV together with polarized glasses. Another way is to quickly alternate the left and the right image on the screen and have the user wear shutter glasses that are synchronized with the screen. Digital cinemas today often use a polarization filter in front of the projector. The filter can change direction every $120^{th}$ of a second, which allows time multiplexing to work together with relatively inexpensive polarized glasses.

However, consumers do not like to wear glasses, and this may be the reason why 3D TV is now seen as a failure within the TV industry. Therefore new TV screens that do not require glasses are emerging.

Glasses free 3D display can be achieved by using a lenticular array in front of the screen. This makes it possible to make some pixels visible only from certain angles. In the simplest form, a lenticular display can be created to have every second column of pixels visible only by the left eye and the remaining columns only visible by the right eye. However, this requires the viewer to be positioned in a very tightly defined sweet spot in front of the display.

Another solution is to use steerable displays that rely on eye-tracking. By finding the position of each eye of the viewer, the display can control the lenticular array so that it is always sending the left image to the left eye and the right image to the right eye. If this is combined with rendering the content from the correct position the effect could be very convincing in theory.

Another way that has been tried to solve this problem is to use so called multi-view displays. Instead of displaying just two views, these displays can display several views with a small distance between. Your left eye may see view number 1 and your right eye may see view number 7. By moving slightly to the right, you may instead see view number 2 and view number 8 and this makes it possible to "look around" objects.

Channel changing, i.e. zapping, has been controlled by a remote control for a long time, after that smart phones and tablets have been used. These prior art channel changing solutions do, however, not exploit the full potentials of multi-view TV. Hence, the prior art channel changing solutions give the viewer a poor overview of the available channels during a channel changing procedure.

US 2011/0164188 relates to a remote control device adapted for use in connection with stereoscopic 3D and multi-view 3D displays. The remote control device is used by a viewer to enable selection of content to be displayed by a display screen. The remote control device is further used to generate location information relating to the position of the eyes of the viewer. A reconfiguration of the screen is then caused based on the location information.

SUMMARY

It is a general objective to provide an efficient multi-view display control.

It is a particular objective to control channel selection of multi-view video channels in a user-friendly and efficient way.

These and other objectives are met by embodiments disclosed herein.

An aspect of the embodiments relates to a multi-view display controller operable to receive video data of at least a first multi-view video channel and a second multi-view video channel. The multi-view display controller is also operable to receive, from a positioning device, position information representing positions of a left eye and a right eye of a viewer relative to a multi-view display. The multi-view display controller is further operable to generate view information upon reception of an activation signal and based on the position information. This view information defines, for at least a first pixel area of the multi-view display, i) a first view of the first multi-view video channel with a view angle projecting the first view of the first multi-view video channel onto the left eye of the viewer, ii) a second view of the first multi-view video channel with a view angle projecting the second view of the first multi-view video angle onto the right eye of the viewer, iii) a first view of the second multi-view video channel with a view angle projecting the first view of the second multi-view video channel onto a point in a first direction relative to the left eye of the viewer, and iv) a second view of the second multi-view video channel with a view angle projecting the second view of the second multi-view video channel onto a point in the first direction relative to the right eye of the viewer. The multi-view display controller is additionally operable to output video data of the first multi-view video channel and the second multi-view video channel together with the view information to the multi-view display for simultaneous display of the first multi-view video channel and the second multi-view video channel.

Another aspect of the embodiments relates to a multi-view display controller comprising a first receiver for receiving video data of at least a first multi-view video channel and a second multi-view video channel. The multi-view display controller also comprises a second receiver for receiving, from a positioning device, position information representing positions of a left eye and a right eye of a viewer relative to a multi-view display. The multi-view display controller further comprises a generator for generating view information upon reception of an activation signal and based on the position information. This view information defines, for at least a first pixel area of the multi-view display, i) a first view of the first multi-view video channel with a view angle projecting the first view of the first multi-view video channel onto the left eye of the viewer, ii) a second view of the first multi-view video channel with a view angle projecting the second view of the first multi-view video angle onto the right eye of the viewer, iii) a first view of the second multi-view video channel with a view angle projecting the first view of the second multi-view video channel onto a point in a first direction relative to the left eye of the viewer, and iv) a second view of the second multi-view video channel with a view angle projecting the second view of the second multi-view video channel onto a point in the first direction relative to the right eye of the viewer. The multi-view display controller additionally comprises an output for outputting video data of the first multi-view video channel and the second multi-view video channel together with the view information to the multi-view display for simultaneous display of the first multi-view video channel and the second multi-view video channel.

A further aspect of the embodiments relates to a multi-view display system comprising a multi-view display controller according to above and a multi-view display connectable to the multi-view display controller. The multi-view display system also comprises a positioning device operable to generate position information representing positions of a left eye and a right eye of a viewer relative to the multi-view display. The positioning device is connectable to the multi-view display controller.

Yet another aspect of the embodiments relates to a computer program comprising program code which when executed by a processor causes the processor to receive video data of at least a first multi-view video channel and a second multi-view video channel. The program code also causes the processor to receive, from a positioning device, position information representing positions of a left eye and a right eye of a viewer relative to a multi-view display. The program code further causes the processor to generate view information upon reception of an activation signal and based on the position information. This view information defines, for at least a first pixel area of the multi-view display, i) a first view of the first multi-view video channel with a view angle projecting the first view of the first multi-view video channel onto the left eye of the viewer, ii) a second view of the first multi-view video channel with a view angle projecting the second view of the first multi-view video angle onto the right eye of the viewer, iii) a first view of the second multi-view video channel with a view angle projecting the first view of the second multi-view video channel onto a point in a first direction relative to the left eye of the viewer, and iv) a second view of the second multi-view video channel with a view angle projecting the second view of the second multi-view video channel onto a point in the first direction relative to the right eye of the viewer. The program code additionally causes the processor to output video data of the first multi-view video channel and the second multi-view video channel together with the view information to the multi-view display for simultaneous display of the first multi-view video channel and the second multi-view video channel.

A related aspect of the embodiments defines a computer program product comprising computer readable code means a computer program according to above stored on the computer readable code means.

A further aspect of the embodiments relates to a multi-view control method comprising receiving video data of at least a first multi-view video channel and a second multi-view video channel. The method also comprises receiving, from a positioning device, position information representing positions of a left eye and a right eye of a viewer relative to a multi-view display. The method further comprises generating view information upon reception of an activation signal and based on the position information. This view information defines, for at least a first pixel area of the multi-view display, i) a first view of the first multi-view video channel with a view angle projecting the first view of the first multi-view video channel onto the left eye of the viewer, ii) a second view of the first multi-view video channel with a view angle projecting the second view of the first multi-view video angle onto the right eye of the viewer, iii) a first view of the second multi-view video channel with a view angle projecting the first view of the second multi-view video channel onto a point in a first direction relative to the left eye of the viewer, and iv) a second view of the second multi-view video channel with a view angle projecting the second view of the second multi-view video channel onto a point in the first direction relative to the right eye of the viewer. The method additionally comprises outputting video data of the first multi-view video channel and the second multi-view video channel together with the view information to the multi-view display for simultaneous display of the first multi-view video channel and the second multi-view video channel.

The embodiments provide a user-friendly, efficient and intuitive channel selection in a multi-view display system allowing the viewer to see other available multi-view video or TV channels by simply moving his/her head slightly from a current viewing position.

BRIEF DESCRIPTION OF THE DRAWINGS

The embodiments, together with further objects and advantages thereof, may best be understood by making reference to the following description taken together with the accompanying drawings, in which:

FIG. 12 is a flow chart illustrating additional, optional steps of the method illustrated in FIG. 11;

FIG. 13 is a flow chart illustrating an additional, optional step of the method illustrated in FIG. 12;

FIG. 14 is a flow chart illustrating an additional, optional step of the method illustrated in FIG. 11;

FIG. 15 is a flow chart illustrating an additional, optional step of the method illustrated in FIG. 11;

FIG. 16 is a flow chart illustrating an additional, optional step of the method illustrated in FIG. 11;

FIG. 17 is a flow chart illustrating a multi-view display control method according to another embodiment;

FIG. 19 schematically illustrates projection of different views from pixel areas of a multi-view display according to an embodiment;

FIG. 20 schematically illustrates an example of calculating view angles; and

FIG. 21 schematically illustrates a multi-view display projecting views with different view angles according to an embodiment.

DETAILED DESCRIPTION

Throughout the drawings, the same reference numbers are used for similar or corresponding elements.

The present embodiments generally relate to multi-view display control, and in particular to controlling channel selection of multi-view video channels.

The present embodiments utilize the characteristics of multi-view displays in order to provide an intuitive and user-friendly channel selection or zapping between different multi-view video channels, also referred to as multi-view TV channels or 3D TV channels herein. In a general concept, a current multi-view video channel that a user is watching is placed in front of him/her. However, by moving his/her head slightly he/she may look into what is going on in other available multi-view video channels. Hence, the user can easily scan what is going on the other multi-view video channels and be able to select the one that he/she finds most interesting.

Multi-view video channels as used herein encompasses any multi-view video data or streams that can be presented on a multi-view display regardless or the storage location or the provider of the multi-view video channels. For instance, the multi-view video channels could be multi-view TV channels provided by a TV channel provider. Alternatively, the multi-view video channels could be multi-view video data or streams locally stored on a memory of a computer, set-top box, multi-view display system or other entity at the home of the viewer. Hence, also different multi-view video streams, possible originating from different sources, such as recorded by a video camera, downloaded from the Internet, etc., could be regarded as multi-view video channels according to the embodiments.

Figure 1:
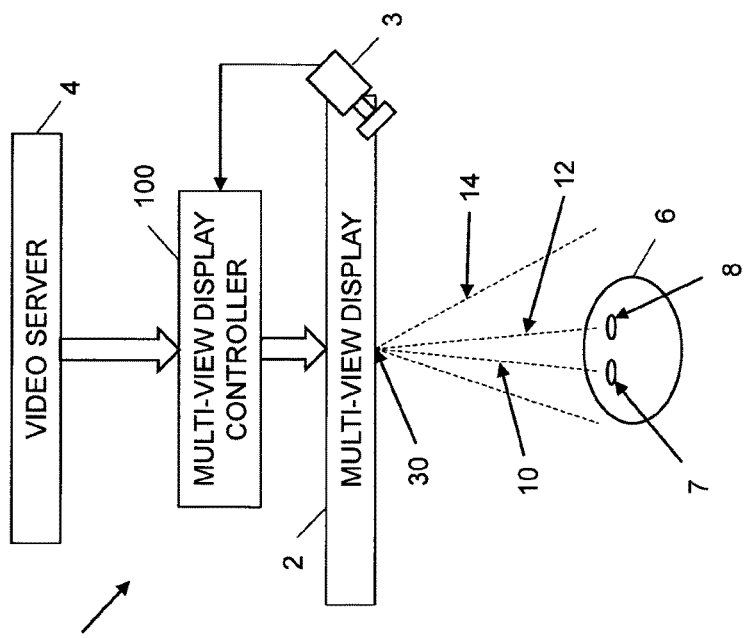
FIG. 1 is a schematic overview of a multi-view display system according to an embodiment prior to a channel selection procedure.

FIG. 1 schematically illustrates a multi-view display system 1 according to an embodiment prior to a channel selection procedure. The multi-view display system 1 generally comprises a multi-view display controller 100 connectable to a multi-view display 2. A positioning device 3 is connectable to the multi-view display controller 100 and is operable to generate position information representing positions of a left eye 7 and a right eye 8 of a viewer 6 relative to the multi-view display 2.

In an optional embodiment, the multi-view display system 1 also comprises or is at least connectable, wirelessly and/or via a wired connection, to a video server 4. The video server 4 is then operable to provide video data of at least a first multi-view video channel and a second multi-view video channel to the multi-view display controller 100. The video server 4 could be a remote server of a media or TV channel provider or a local TV or media server, e.g. a memory storing different multi-view video streams or data.

Entities of the multi-view display system 1, i.e. the multi-view display 2, the positioning device 3 and optionally the video server 4, are connectable to the multi-view display controller 100. The connections could be implemented as wireless connections, wired connections or combinations of wired and wireless connections.

The multi-view display controller 100 of FIG. 1 receives video data of a current multi-view video channel from the video server 4. The multi-view display controller 100 optionally receives position information from the positioning device 3 and where the optional position information represents positions of the eyes 7, 8 of the viewer 6 relative to the multi-view display 2. The multi-view display controller 100 preferably uses the optional position information in order to generate initial view information for a pixel area 30 of the multi-view display 2. This initial view information defines different views 10, 12, 14 of the current multi-view video channel and where each such view preferably has a respective view angle projecting the view at the respective view angle relative to the multi-view display 2 and thereby relative to the viewer 6. For instance, a first view 10 could have a view angle projecting the first view 10 onto the left eye 7 of the viewer 6, whereas a second view 12 could have a view angle projecting the second view 12 onto the right eye 8 of the viewer 6. Hence, in this way the multi-view display controller 100 and system 1 is able to display different images or views 10, 12 in different directions. This means that the two eyes 7, 8 will see different images and views 10, 12 and the viewer 6 will, thus, perceive 3D video. By moving the head slightly the viewer 6 may instead see other views 14 of the current multi-view video channel. Accordingly, this makes it possible to look around objects and get a true 3D experience.

In an embodiment, the multi-view display controller 100 could generate the initial view information without input of any position information. For instance, the multi-view display controller 100 could display different views of the current multi-view video channel at different predefined or pre-selected view angles.

Figure 2:
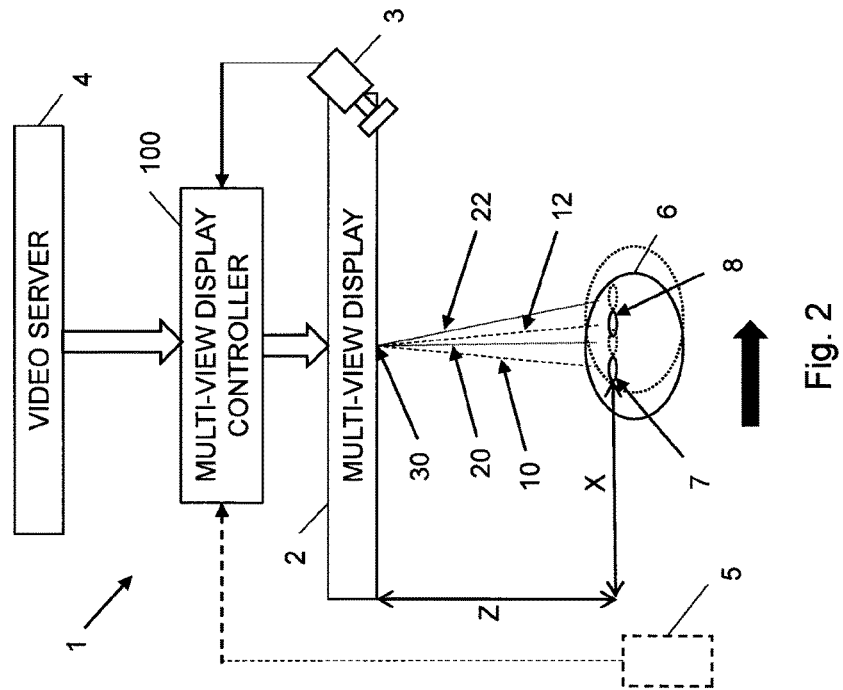
FIG. 2 is a schematic overview of a multi-view display system according to an embodiment during a channel selection procedure.

An aspect of the embodiments relates to a multi-view display controller 100, see FIG. 2. The multi-view display controller 100 is operable to receive video data of at least a first multi-view video channel and a second multi-view video channel. The multi-view display controller 100 is also operable to receive, from a positioning device 3, position information representing positions of a left eye 7 and a right eye 8 of a viewer 6 relative to a multi-view display 2. The multi-view display controller 100 is further operable to generate view information upon reception of an activation signal and based on the position information. This view information defines, for at least a first pixel area 30 of the multi-view display 2, i) a first view 10 of the first multi-view video channel with a view angle projecting the first view 10 of the first multi-view video channel onto the left eye 7 of the viewer 6, ii) a second view 12 of the first multi-view video channel with a view angle projecting the second view 12 of the first multi-view video angle onto the right eye 8 of the viewer 6, iii) a first view 20 of the second multi-view video channel with a view angle projecting the first view 20 of the second multi-view video channel onto a point in a first direction (represented by black arrow in FIG. 2) relative to the left eye 7 of the viewer 6, and iv) a second view 22 of the second multi-view video channel with a view angle projecting the second view 22 of the second multi-view video channel onto a point in the first direction relative to the right eye 8 of the viewer 6. The multi-view display controller 100 is additionally operable to output video data of the first multi-view video channel and the second multi-view video channel together with the view information to the multiview display 2 for simultaneous display of the first multi-view video channel and the second multi-view video channel.

In a more general embodiment, the multi-view display controller 100 is operable to receive video data of multiple, i.e. at least two, video channels, such as from the video server 4. The multi-view display controller 100 is also operable to receive, from the positioning device 3, position information representing positions of the left eye 7 and the right eye 8 of the viewer 6 relative to the multi-view display 2. The multi-view display controller 100 is further operable to generate, upon on reception of the activation signal and based on the position information, view information. In this embodiment, the view information defines, for at least the first pixel area 30, i) a first view 10 of a current multi-view video channel of the multiple multi-view video channels with a view angle projecting the first view 10 onto the left eye 7 of the viewer 6, ii) a second view 12 of the current multi-view video channel with a view angle projecting the second view 12 onto the right eye 8 of the viewer 6, iii) a respective first view 20 of each multi-view video channel of the multiple multi-view video channels except the current multi-view video channel with a respective view angle projecting the respective first view 20 onto a respective point in a respective defined direction relative to the left eye 7 of the viewer 6, and iv) a respective second view 22 of the each multi-view video channel of the multiple multi-view video channels except the current multi-view video channel with a respective view angle projecting the respective second view 22 onto a respective point in the respective defined direction relative to the right eye 8 of the viewer 6. The multi-view display controller 100 is additionally operable to output video data of the multiple multi-view video channels together with the view information to the multi-view display 2 for simultaneous display of the multiple multi-view video channels.

Hence, the multi-view display controller 100 initiates a channel selection procedure upon reception of the activation signal. This means that the multi-view display controller 100 generates the view information based on information of the current positions of the left and right eyes 7, 8 of the viewer 6 relative to the multi-view display 2 as represented by the position information from the positioning device 3. The multi-view information defines which view angles different views 10, 12, 20, 22 of the available multi-view video channels should be projected or displayed from at a given pixel area 30 of the multi-view display 2. In addition, the view angles are selected so that at the current positions of the eyes 7, 8 the first view 10 of the first or current multi-view video channel will be projected or displayed onto the left eye 7 and the second view 12 of the first or current multi-view video channel will be projected or displayed onto right eye 8. Correspondingly, the first view 20 and the second view 22 of the second multi-view video channel are projected onto a respective point in a first direction relative to the current positions of the eyes 7, 8. In FIG. 2, this direction is to the right as shown by the black arrow. This means that if the viewer 6 moves his/her head slightly to the right he/she will see views 20, 22 of the second multi-view video channel instead of the views 10, 12 of the first multi-view video channel. Hence, at these new or updated positions of the eyes 7, 8, as indicated by dotted lines in FIG. 2, the first view 20 of the second multi-view video channel will be projected onto the left eye 7 and the second view 22 of the second multi-view video channel will be projected onto the right 8.

Projection of a view 10, 12, 20, 22 onto an eye 7, 8 as used herein implies that the multi-view display 2 displays the view 10, 12, 20, 22 at view angle so that the eye 7, 8 will see that particular view 10, 12, 20, 22. Hence, a given pixel area 30 of the multi-view display 2 projects or displays the view 10, 12, 20, 22 at a view angle so that the displayed video data will be seen by eye 7, 8 of the viewer 6.

Figure 18:
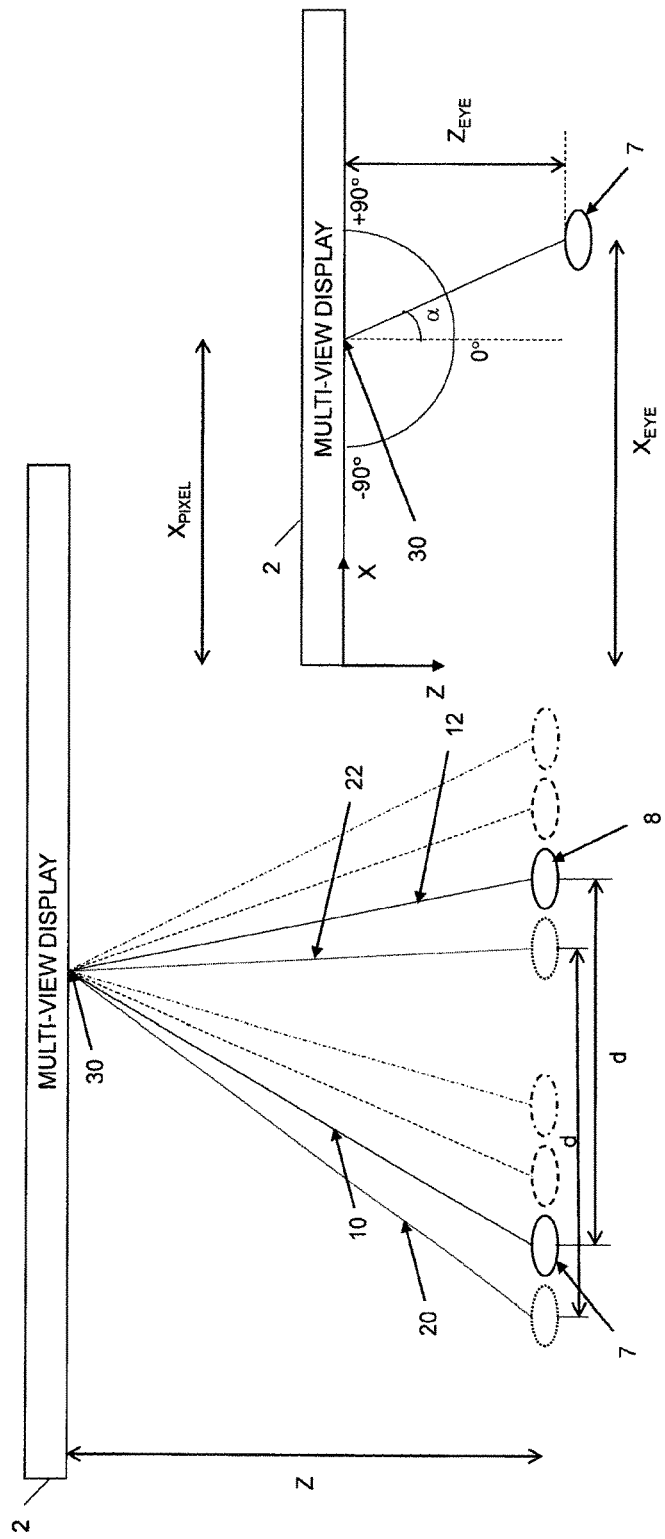
FIG. 18 illustrate different positions of the eyes of a viewer.

The above presented concept can of course be extended further when having access to more than two multi-view video channels. Thus, by moving the head along the first direction the viewer 6 will see different multi-view video channels. This concept is shown in FIG. 18 where the eyes 7, 8 in solid lines represent the current or initial positions of the eyes 7, 8 seeing the first and second views 10, 12 of the current or first multi-view video channel. If the viewer moves his/her head slightly to the left (dotted lines) the eyes 7, 8 will be at respective positions seeing first and second views 20, 22 of another multi-view video channel. Correspondingly, if the viewer moves the head slightly to the right (dashed lines) the eyes 7, 8 will be at respective positions seeing first and second views of a further multi-view video channels. If the viewer moves the head even further to the right (dotted-dashed lines) he/she will see first and second views of yet another multi-view video channel.

Generally, this can go on until the viewer has moved the head so much that the left eye 7 would see the right view of another multi-view video channel 22. That would send the right view to the left eye 7, which would not result in a pleasant viewing experience. In order to solve this problem, the positioning device could provide updated position information to the multi-view display control device so that the multi-view display control device could provide a left view of yet another multi-view video channel at this position in case the viewer has moved his/her head so far. Another possibility is to limit channel switching movements to smaller distance movement for which such a problem does not occur.

Hence, at each of the positions schematically depicted in FIG. 18 the left and right eyes 7, 8 preferably receive and see a respective view 10, 12, 20, 22 of a multi-view video channel. This means that the view information as generated by the multi-view display controller defines the respective view angles of the views 10, 12, 20, 22 of the multi-view video channels so that left and right eyes 7, 8 of the viewer will be presented by a respective view 10, 12, 20, 22 of the multi-view video channel depending on the positions of the eyes 7, 8 relative to the initial or current position. In an embodiment, the view information thereby defines the view angles so that if the eyes 7, 8 of the viewer are at the same depth Z relative to the multi-view display 2 the inter-view position of the respective first view 10, 20 and second view 12, 22 of each multi-view video channel will be substantially the same at the depth Z and substantially corresponding to the distance d between the left eye 7 and the right eye 8 of the viewer.

A significant advantage of the present embodiments is that the video data of the other multi-view video channels are available to the viewer without any delay. Hence, only by moving the head slightly the viewer instantly will see views of other available multi-view video channels. This should be compared to prior art solutions using various set-top boxes and remote controls for providing and changing video channels. In such prior art solutions, there is a certain delay from pushing a channel switching button until the video data of the new video channel is presented to the viewer on a display. No such delays are necessary or perceived by the present embodiments.

In FIGS. 2 and 18 the viewer 6 can see views 20, 22 of other multi-view video channels than the current multi-view video channel by moving his head horizontally (along the X axis in FIG. 2) along the direction as shown by the arrow in FIG. 2. In an embodiment, the view information is defined so that the viewer 6 can see other multi-view video channels by moving his/her head substantially horizontally to the right (in the direction of the arrow). In another embodiment, the view information is defined so that the viewer 6 can see other multi-view video channels by moving his/her head substantially horizontally to the left (opposite the direction indicated by the arrow). In yet another embodiment, the view information is defined so that the viewer 6 can see at least one other multi-view video channel by moving his/her head to the right and at least one other multi-view video channel by moving the head to the left. In such a case, the respective view angles of the views 10, 12, 20, 22 are selected by the multi-view display controller 100 to get the multi-view video channel presented to the viewer 6 along the X-axis as $C_{-k}$, $C_{-2}$, $C_{-1}$, $C_0$, $C_1$, $C_2$, $C_h$, wherein $C_0$ represents the current multi-view video channels and $C_{-1}$ represents one channel down, $C_1$ represents one channel up and so on.

Instead of defining the view angles of the multi-view video channels at the pixel area 30 of the multi-view display 2 and thereby the view information to display different multi-view video channels to the viewer 6 at different horizontal positions, the multi-view display controller 100 could instead define the view information to define the view angels of the multi-view video channels to present different multi-view video channels to the viewer 6 at depth Z but at different vertical positions. The viewer 6 thereby can see the other multi-view video channels by moving his/her head upwards and/or downwards.

The above presented concepts of presenting other multi-view channels at different horizontal positions or at different vertical positions can be combined in an embodiment. In such a case, at least one other multi-view video channel in addition to the current multi-view video channel can be accessed by moving the head to the left or right and at least one other multi-view video channel can be accessed by moving the head up or down.

The view information defines the different views 10, 12, 20, 22 of the multi-view video channels and their respective view angles. Hence, the view information provides, to the multi-view display 2, information of which views 10, 12, 20, 22 that should be displayed at the first pixel area 30 of the multi-view display 2 and in what view angle relative to the multi-view display 2. For instance, the view information could define that view i of multi-view video channel j should be displayed at view angle α for pixel area n, $α_n$: $data_j^i$, wherein $data_j^i$ indicates video data of view i of multi-view video channel j.

The multi-view display 2 thereby uses this view information to decide which received video data that should be presented at what view angle to the viewer 6 for different pixel areas 30.

FIG. 19 schematically illustrates the concept of projecting views 10-18, 20-28 at different view angles from a portion of a multi-view display 2. In this very schematic example, the shown portion of the multi-view display 2 has five pixel areas 30-34, such as pixels, from which video data of different views 10-18, 20-28 can be projected at different view angles. Each such pixel area 30-34 is able to project video data at nine different view angles. Accordingly, nine different views 10-18, 20-28 of a multi-view video channel can be projected from each pixel area 30-34. In the lower portion of the figure, the left and right eyes 7, 8 of a viewer are shown. The solid lines to the left represent a first or current position of the eyes 7, 8 relative to the multi-view display 2, whereas the dashed lines illustrate the situation when the eyes 7, 8 have moved slightly along the direction as shown by the thick arrow. The illustration A shows how views 10-14 of a first multi-view video channel are projected from the pixel areas 30-34 onto the left eye 7 at the initial position of the viewer. The illustration B shows the same initial position of the viewer but shows the views 12-16 of the first multi-view video channel projected from the pixel areas 30-34 onto the right eye 8. The illustration has been split into two, A and B, in order to simplify the figure.

Illustrations C and D show the case when the viewer has moved slightly to the right during the channel selection procedure. At this updated position, the left eye 7 will see views 21-25 of a second multi-view video channel and the right eye 8 will, as shown in illustration D, see views 23-27 of the second multi-view video channel.

Figure 7:
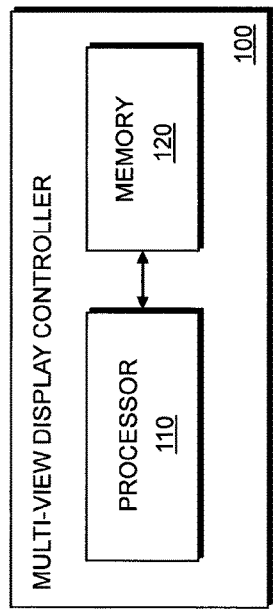
FIG. 7 is a schematic block diagram of a multi-view display controller according to an embodiment.

The multi-view display controller 100 may, in an embodiment, be implemented as a processor 110 and a memory 120 as shown in FIG. 7. In such a case, the processor 110 is operable to receive the video data and receive the position information from the positioning device. The processor 110 is also operable to generate the view information upon reception of the activation signal and based on the position information. The processor 110 is additionally operable to output the video data together with the view information to the multi-view display for simultaneous display of the first multi-view video channel and the second multi-view video channel.

The activation signal as received by the processor 110 triggers the multi-view display controller 100 to initiate a channel selection procedure to thereby simultaneously present multiple multi-view video channels on the multi-view display for the viewer. Different types of activation signals are possible and can be used according to the embodiments.

In an embodiment, the processor 110 is operable to receive the activation signal from a remote control device 5 as shown in FIG. 2.

The remote control device 5 can be any device that transmits, preferably wirelessly transmits although wired transmission is possible but generally less preferred, the activation signal to the multi-view display controller 100 and the processor 110 therein. The remote control device 5 could, for instance, be a dedicated remote control that the viewer 6 can use to control the multi-view display controller 100 and optionally the multi-view display 2. Alternatively, the remote control device 5 could be a general communication and processing unit, such as mobile telephone, smart phone, tablet, computer, etc., which comprises a software program, module or application that can be used to control the multi-view display controller 100. In such a case, the viewer 6 could press a button or activate a defined portion of a touch-sensitive screen of the remote control device 5 to generate and transmit the activation signal to the multi-view display controller 100 to initiate the channel selection procedure.

In another embodiment, the processor 110 is operable to receive the activation signal from the positioning device 3 based on detection, by the positioning device 3, of a predefined movement of the viewer 6.

Various types of predefined movements could be detected by the positioning device 3 and trigger generation of the activation signal. For instance, if the multi-view display controller 100 is operable to present the different multi-view video channels at different horizontal positions to the viewer 6 as shown in FIG. 2 then a predefined movement of the viewer 6 could be nodding the head. Alternatively, movement of the eye lids, such as blinking in a defined pattern of at least one of the eyes 7, 8, could be detected by the positioning device 3 and trigger generation of the activation signal. For instance, blinking of the left eye 7 or the right eye 8 could trigger generation of the activation signal. Another alternative would be to generate the activation signal upon detection of the viewer closing one of his/her eyes. Also movements of other body parts besides the eyes 7, 8 are possible. For instance, movement of one of the arms or hands of the viewer 6 could trigger generation of the activation signal.

A further alternative is to generate the activation signal based on detection, by a microphone connected to the multi-view display controller 100, of a predefined voice command from the viewer 6.

In an embodiment, the processor 110 of the multi-view display controller 100 is operable to receive, from the positioning device 3 and following reception of a channel selection signal, updated position information representing updated positions of the left eye 7 and the right eye 8 of the viewer 6. The processor 110 is also operable to select a multi-view video channel of the at least first multi-view video channel and the second multi-view video channel based on the updated position information. The processor 110 is further operable to output video data of the selected multi-view video channel to the multi-view display 2.

Thus, the processor 110 receives updated position information representing updated positions of the eyes 7, 8 of the viewer 6 at the end of the channel selection procedure. The processor 110 uses this updated position information in order to determine which multi-view video channel the viewer 6 is currently watching once the channel selection signal is received by the processor 110. This means that if the viewer 6 has moved his/her head slightly from the initial position in which the viewer 6 was watching the first or current multi-view video channel to the updated position at which the eyes 7, 8 of the viewer receives first and second views of another multi-view video channel then the processor 110 selects this another multi-view video channel based on the updated position information of the updated eye positions relative to the multi-view display 2. The processor 110 will thereafter output video data of this selected multi-view video channel to the multi-view display 2 to present views of the selected multi-view video channel to the viewer 6.

In a particular embodiment, the processor 110 of the multi-view display controller 100 responds to two signals, i.e. the activation signal and the channel selection signal. The activation signal triggers, as discussed in the foregoing, the channel selection procedure, while the channel selection signal could be regarded as ending the channel selection procedure by causing the processor 110 to select the multi-view video channel that the viewer 6 currently is watching when the processor 110 receives the channel selection signal.

Hence, prior to the channel selection procedure the processor 110 preferably outputs video data of the current or first multi-view video channel to the multi-view display 2 for display to the viewer 6. During the channel selection procedure the processor 110 preferably outputs video data of at least the first and second multi-view video channel for simultaneous display to the viewer 6 at the multi-view display 2. Correspondingly, following the channel selection procedure the processor 110 preferably outputs video data of the selected multi-view video channel to the multi-view display for display to the viewer 6.

Thus, prior to the channel selection procedure, the viewer 6 preferably only sees views of the current or first multi-view video channel when moving his/her head relative to the multi-view display 2. Thus, the viewer 6 will then see the scene of the current multi-view video channel but from different angles. Correspondingly, following the channel selection procedure, the viewer 6 preferably only sees views of the selected multi-view video channel when moving the head. Thus, in a preferred embodiment, it is only during the channel selection procedure that views from different multi-view video channels are accessible and can be seen by the viewer 6 by moving his/her head.

The selected multi-view video channel is thereby the multi-view video channel that the viewer 6 is actually watching when the processor 110 receives the channel selection signal. For instance, if the viewer 6 has moved his/her head to the left in FIG. 18 relative to the initial position watching the first and second views 10, 12 of the first multi-view video channel to instead watch the first and second views 20, 22 of the second multi-view video channel when the processor 110 receives the channel selection signal, then this second multi-view video channel will be selected as the so-called selected multi-view video channel. The selection is made by the processor 110 based on the updated position information representing the new or updated positions of the eyes 7, 8 of the viewer 6 watching the first and second views 20, 22 of the second multi-view video channel.

The processor 110 preferably uses the updated position information together with information of the respective view angles for the views 10, 12, 20, 22 of the multi-view video channels in order to determine which multi-view video channel the viewer 6 is actually seeing and that should be the selected multi-view video channel upon reception of the channel selection signal.

In an embodiment, the processor 110 is operable to generate, upon reception of the channel selection signal and based on the updated position information, updated view information. This updated view information defines, for the at least first pixel area 30, i) a first view of the selected multi-view video channel with a view angle projecting the first view of the selected multi-view video channel onto the left eye 7 of the viewer 6, and ii) a second view of the selected multi-view video channel with a view angle projecting the second view of the selected multi-view video channel onto the right eye 8 of the viewer 6. In this embodiment, the processor 110 is also operable to output the video data of the selected multi-view channel together with the updated view information to the multi-view display 2 for display of the selected multi-view video channel.

The generation of the channel selection signal triggering the selection of a multi-view video channel and optionally also the generation of the updated view information can be performed similar to the generation of the activation signal as discussed in the foregoing.

Hence, in an embodiment, the channel selection signal is generated and transmitted by the remote control device 5. For instance, when the viewer 6 wants to change channel, he/she presses and holds a button. This triggers generation and transmission of the activation signal. The viewer 6 then moves the head to see the available multi-view video channels. Once a desired multi-view video channel has been found, the viewer 6 could simply release the button. This triggers generation and transmission of the channel selection signal. A similar approach can also be used when activating a dedicated area of a touch-sensitive screen.

Alternatively, the viewer presses the button or dedicated area once to generate the activation signal. He/she then moves the head to select a desired channel and then presses the button or dedicated area once more when the desired multi-view video channel is shown to generate the channel selection signal. In a related embodiment, a first button or dedicated area is pressed to generate the activation signal and a second, different button or dedicated area is pressed to generate the channel selection signal.

Alternatively, the channel selection signal is generated by the positioning device 3 and not the remote control device 5. The channel selection signal could thereby be generated upon detection by the positioning device 3 of a predefined movement of the viewer 6, such as nodding or blinking. For instance, if blinking of one of the eyes 7, 8 triggers generation of the activation signal, blinking of the other eye could trigger generation of the channel selection signal. Correspondingly, if the activation signal is generated upon detection of closing one of the eyes as mentioned in the foregoing, the channel selection signal could be generated upon detection of opening of the eye. Also movements of other body parts besides the eyes 7, 8 are possible. For instance, movement of one of the arms or hands of the viewer 6 could trigger generation of the channel selection signal.

A further alternative is to generate the channel selection signal based on detection, by a microphone connected to the multi-view display controller 100, of a predefined voice command.

Note that the selected multi-view video channel could be the same multi-view video channel the viewer 6 was watching prior to the channel selection procedure or a different multi-view video channel depending on the updated position of the viewer 6 and his/her eyes 7, 8 at the time of generation of the channel selection signal.

Figure 3:
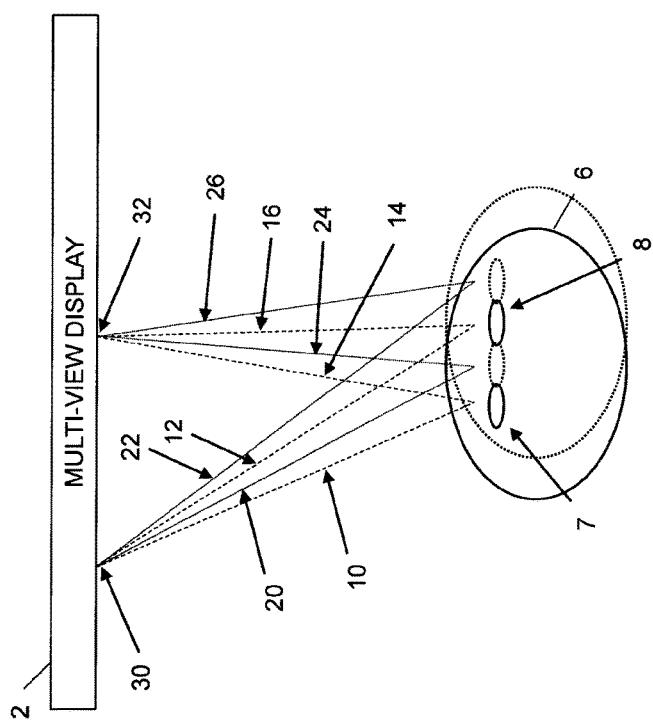
FIG. 3 schematically illustrates displaying multi-view video channels to a viewer during a channel selection procedure according to an embodiment.

In an embodiment, the processor 110 is operable to generate the view information based on the position information and upon reception of the activation signal as shown in FIG. 3. In this embodiment, the view information defines, for the first pixel area 30, i) the first view 10 of the first multi-view video channel with the view angle projecting the first view 10 of the first multi-view video channel onto the left eye 7 of the viewer 6, ii) the second view 12 of the first multi-view video channel with the view angle projecting the second view 12 of the first multi-view video channel onto the right eye 8 of the viewer 6, iii) the first view 20 of the second multi-view video channel with the view angle projecting the first view of the second multi-view video channel onto the point in the first direction relative to the left eye 7 of the viewer, and iv) the second view 22 of the second multi-view video channel with the view angle projecting the second view 22 of the second multi-view video channel onto the point in the first direction relative to the right eye 8 of the viewer 6. The view information additionally defines, in this embodiment and for a second pixel area 32 of the multi-view display 2, i) a third view 14 of the first multi-view video channel with a view angle projecting the third view 14 of the first multi-view video channel onto the left eye 7 of the viewer 6, ii) a fourth view 16 of the first multi-view video channel with a view angle projecting the fourth view 16 of the first multi-view video channel onto the right eye 8 of the viewer 6, iii) a third view 24 of the second multi-view video channel with a view angle projecting the third view 24 of the second multi-view video channel onto the point in the first direction relative to the left eye 7 of the viewer 6, and iv) a fourth view 26 of the second multi-view video channel with the view angle projecting the fourth view 26 of the second multi-view video channel onto the point in the first direction relative to the right eye 8 of the viewer 6.

Hence, in this embodiment the eyes 7, 8 of the viewer 6 will each receive multiple views 10, 14; 12, 16; 20, 24; 22, 26 of respective multi-view video channel both at the initial position and once the head has been moved to an updated position as shown in FIG. 3. This means that the viewer 6 will experience a true 3D effect even during the channel selection procedure. This could be preferred since the viewer 6 will then experience 3D TV or video both prior to, during and following the channel selection procedure.

In a particular embodiment, each pixel area 30, 32 of the multi-view display 2 preferably projects views 10, 12, 14, 16; 20, 22, 24, 26 at different projection angles as schematically shown in FIG. 19 and previously discussed herein.

In an alternative approach, the 3D effect is temporarily switched off during the channel selection procedure by not projecting different views of the same multi-view video channel to left eye 7 or the right eye 8 when the viewer 6 is about to select a new multi-view video channel by moving his/her head. The 3D video or TV is, however, preferably enabled and active for the current multi-view video channel prior to the channel selection procedure and for the selected multi-view video channel after the channel selection procedure.

The respective pixel areas 30, 32 of the multi-view display 2 can be defined according to various embodiments.

In a first embodiment, a pixel area 30, 32 constitutes a column of pixels of the multi-view display 2. The column could be one pixel in width but extend over the whole height of the multi-view display 2. Alternatively, the column could have a width of multiple, i.e. at least two, consecutive pixels while having a height corresponding to the whole height of the multi-view video display 2. These approaches are typically preferred for a situation where channel selection is achieved by moving the head of the viewer 6 substantially horizontally.

In some multi-view displays 2, the pixel pattern is tilted slightly. This is generally an implementation issue and enables a reduction of the need for pixel density in the X-direction by borrowing from the Y-direction. In such a case, a pixel column could then be a tilted column of pixels that align to the general tilted pixel pattern of the multi-view display.

In a second embodiment, a pixel area 30, 32 constitutes a row of pixels of the multi-view display 2. The row could be one pixel in height but extend over the width of the multi-view display 2. Alternatively, the row could have a height of multiple consecutive pixels while having a width corresponding to the whole width of the multi-view video display 2.

In a third embodiment, a pixel area 30, 32 constitutes a block of pixels of the multi-view display 2, such as a block of M×N pixels, wherein M,N are integers larger than or equal to one.

The processor 110 is, in an embodiment, preferably operable to calculate the view angles based on a respective depth of the left eye 7 and the right eye 8 of the viewer 6 relative to the multi-view display 2 and based on a respective distance of the left eye 6 and the right 7 of the viewer 6 in a direction parallel to the first direction relative to a predefined point on the multi-view display 2. In this embodiment, the depths and distances are obtained based on the position information.

FIG. 2 schematically illustrates this depth as Z and the distance parallel to the first direction (black arrows) as X. In the shown example, the predefined point on the multi-view display 2 is the upper left corner of the multi-view display 2. This should, however, merely be seen as an illustrative but non-limiting example and any corner or indeed any other predefined point of the multi-view display 2 could be used as reference point for defining the distance X and depth Z. In FIG. 2 the viewer 2 moves his/her head substantially horizontally in order to view the other available multi-view video channels during the channel selection procedure. Hence, the distance X is preferably along a horizontal axis. If the channel selection instead involves moving the head vertically, the distance is preferably along a vertical axis.

The depths Z and distances X could be determined by the processor 110 based on the position information received from the positioning device 3. Alternatively, the position information itself contains the depth and distance values so that the processor 110 simply retrieves them from the received position information.

In the former case, the processor 110 is thereby preferably operable to determine, based on the position information, a respective depth of the left eye 7 and the right eye 8 of the viewer 6 relative to the multi-view display 2 and a respective distance of the left eye 7 and the right eye 8 of the viewer 6 in a direction parallel to the first direction relative to a predefined point on the multi-view display 2. The processor 110 is preferably also operable to generate, upon reception of the activation signal, the view information based on the depth and distance of the left eye 7 of the viewer 6 and the depth and distance of the right eye 8 of the viewer 6.

In particular, the processor 110 preferably uses the depth and distance values to calculate the different view angles. FIG. 20 schematically illustrates an example of how the view angle of a pixel area 30 can be calculated using depth and distance values. For instance, $$\tan\alpha = \frac{X_{EYE} - X_{PIXEL}}{Z_{EYE}},$$

wherein α represents the view angle and $Z_{EYE}$, $X_{EYE}$ and $X_{PIXEL}$ are defined in FIG. 20. This means that the view angle can be obtained as $$\alpha = \arctan\frac{X_{EYE} - X_{PIXEL}}{Z_{EYE}}.$$

In an embodiment, the view information preferably defines, for each pixel column of the multi-view display 2, at least one view for each multi-view video channel of the multiple multi-view video channels with a respective view angle. In such a case, a view angle for a view of a multi-view video channel of the multiple multi-view video channels for a first pixel column of the multi-view display 2 is a same as a view angle for another view of the multi-view video channel for a second pixel column of the multi-view display 2, see FIG. 19.

In this approach, each pixel column preferably projects at least one view of each multi-view video channel. In addition, the view angle or view angle ranges used for the at least one view is preferably the same for all views of a given multi-view video channel regardless of pixel column.

For instance, the processor 110 could generate the view information to define
for pixel column 1, send views no. 90 through 89 for channel 1, send views no. 88 through 87 for channel 2 and so on for channels 3 to n;
for pixel column 2, send views no. 88 through 87 for channel 1, send views no. 86 through 85 for channel 2 and so on for channels 3 to n;
for pixel column 3, send views no. 86 through 85 for channel 1, send views no. 84 to 83 for channel 2 and so on for channels 3 to n;
. . .
for pixel column 1920, send views 2 through 1 for channel 1, send views no. 2 through 1 for channel 2 and so on for channels 3 to n.

This means that each pixel column sends, in this illustrative example, two respective views for each of the n multi-view video channels. The views of channel 1 has the lowest view angles, followed by the views for channel 2 and so on up to channel n.

Generally, it is preferred to project at least two views in each pixel column, preferably more than two views. Otherwise there is a risk, during the channel selection procedure, that video data of different multi-view video channels will be blended. FIG. 21 illustrates this concept. At position A the eye is positioned in between two views 10, 12 of a first multi-view video channel that is projected from a pixel area 30 of the multi-view display 2. The eye will thereby at this position A only see video data of the first multi-view video channel. Correspondingly, if the eye is instead moved to position C, it will perceive video data of two views 20, 22 of a second multi-view video channel. In position B, however, the eye will see video data of one view 12 of the first multi-view video channel and one view 20 of the second multi-view video channel. There will therefore at this position B be a blend of the two multi-view video channels. If the eye is moved from position A to position C through position B, the viewer will experience a "soft" transition between the two multi-view video channels.

As previously discussed herein, the processor 110 is preferably operable to output, prior to reception of the activation signal, video data of the first multi-view channel to the multi-view display 2.

Thus, prior to initiation of the channel selection procedure, the processor 110 preferably only outputs, for the given viewer 6, video data of the views 10, 12, 14 of the first or current multi-view channel to the multi-view display 2 for display, see FIG. 1.

Figure 4:
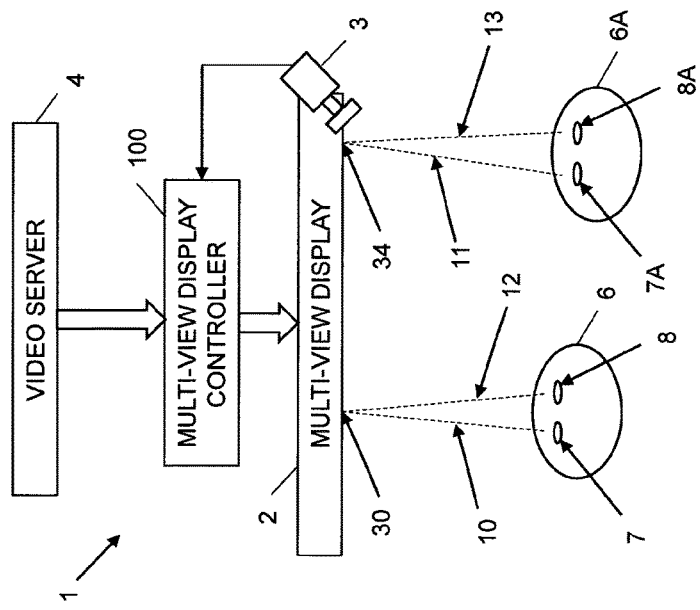
FIG. 4 is a schematic overview of a multi-view display system according to another embodiment prior to a channel selection procedure.

In a particular embodiment as shown in FIG. 4, the processor 110 of the multi-view display controller 100 is operable to generate initial view information. The initial view information preferably defines, for at least the first pixel area 30, i) the first view 10 of the first multi-view video channel with the view angle projecting the first view 10 of the first multi-view video channel onto a left eye 7 of the a first viewer 6, and ii) the second view 12 of the first multi-view video channel with the view angle projecting the second view 12 of the first multi-view video channel onto a right eye 8 of the first viewer 6. The initial view information preferably also defines, for at least a third pixel area 34 of the multi-view display 2, i) a view 11 of one of the at least first and second multi-view video channel with a view angle projecting the view 11 of the one of the at least first and second multi-view video channel onto a left eye 7A of a second viewer 6A, and ii) another view 13 of the one of the at least first and second multi-view video channel with a view angle projecting the another view 13 of the one of the at least first and second multi-view video channel onto a right eye 8A of the second viewer 6A.

The processor 110 is additionally operable to output video data of the first multi-view video channel and the one of the at least first and second multi-view video channel together with the initial view information to the multi-view display 2 for simultaneous display of the first multi-view video channel and the one of the at least first and second multi-view video channel.

In an optional embodiment, the processor 110 is also operable to receive, from the positioning device 3, first position information representing positions of the left eye 7 and a right eye 8 of the first viewer 6 relative to the multi-view display 2 and second position information representing positions of the left eye 7A and the right eye 8A of the second viewer 6A relative to the multi-view display 2. The processor 110 is preferably also operable to generate initial view information based on the first position information and the second position information.

In an alternative approach, the initial view information is generated without the need for any first position information and second position information. For instance, the processor 110 could generate the initial view information defining different pre-defined or pre-selected view angles for the different views 10, 11, 12, 13 of the multi-view video channels.

Hence, in this embodiment as shown in FIG. 4 at least two viewers 6, 6A are simultaneously watching the same multi-view display 2. The two viewers 6, 6A could be watching the same multi-view video channel. In such a case, the one of the at least first and second multi-view video channel is the first multi-view video channel. However, note that the view 11 and the another view 13 as projected onto the second viewer 6A do not need to be the same as the first and second views 10, 12 as seen by the first viewer 6. However, they could be the same views.

Alternatively, the two viewers 6, 6A are watching different multi-view video channels. The one of the at least first and second multi-view video channel is then the second multi-view video channel or another multi-view video channel different from the first multi-view video channel.

Figure 5:
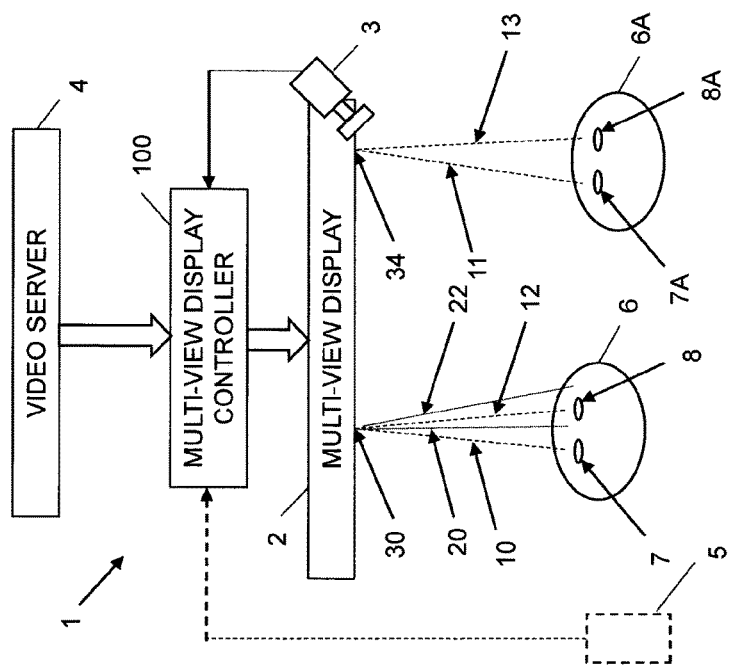
FIG. 5 is a schematic overview of a multi-view display system according to another embodiment during a channel selection procedure.

The embodiment as shown in FIG. 4 and discussed above is taking place prior to any channel selection procedure. FIG. 5 illustrates a corresponding situation during a channel selection procedure according to an embodiment. In an embodiment, the positioning device 3 or alternatively the multi-view display controller 100 is able to determine which of the two viewers 6, 6A that will be the one that select multi-view video channel. This can, for instance, be determined by using the previously mentioned remote control device. Most such remote control device emit infrared (IR) light, which the positioning device 3 could be response to. For instance, most Complementary Metal-Oxide-Semiconductor (CMOS) based cameras, which can be used as positioning device 3, are sensitive to IR light. As a consequence, the positioning device 3 could select the channel-controlling viewer 6 to be the one that is holding and using the remote control device.

Hence, the processor 110 of the multi-view display controller 100 is operable to generate, upon reception of the activation signal and based on the first position information and the second position information, the view information. This view information defines, for at least the first pixel area 30, i) the first view 10 of the first multi-view video channel with the view angle projecting the first view 10 of the first multi-view video channel onto the left eye 7 of the first viewer 6, ii) the second view 12 of the first multi-view video channel with the view angle projecting the second view 12 of the first multi-view video channel onto the right eye 8 of the first viewer 6, iii) the first view 20 of the second multi-view video channel with the view angle projecting the first view 20 of the second multi-view video channel onto point in the first direction relative to the left eye 7 of the first viewer 6, and iv) the second view 22 of the second multi-view video channel with the view angle projecting the second view 22 of the second multi-view video channel onto the point in the first direction relative to right eye 8 of the first viewer 6.

The view information preferably also defines, for at least the third pixel area 34, i) the view 11 of the one of the at least first and second multi-view video channel with the view angle projecting the view 11 of the one of the at least first and second multi-view video channel onto the left eye 7A of the second viewer 6A, and ii) the another view 13 of the one of the at least first and second multi-view video channel with the view angle projecting the another view 13 of the one of the at least first and second multi-view video channel onto the right eye 8A of the second viewer 6A.

The processor 110 is also operable to output video data of the first multi-view video channel and the second multi-view video channel together with the view information to the multi-view display 2 for simultaneous display of the first multi-view video channel and the second multi-view video channel.

In this embodiment and as shown in FIG. 5, during the channel selection procedure the first viewer 6 is presented and able to see, by moving his/her head, video data of the different available multi-view video channels, i.e. at least the first and second multi-view video channels. The second viewer 6A is, however, in this embodiment still watching the same multi-view video channel that he/she was watching prior to the start of the channel selection procedure as triggered upon reception of the activation signal.

This means that only the viewer 6 that initiates the channel selection procedure, such as by pressing a button on the remote control device 5 or performing a predefined movement that is registered by the positioning device 3, will be presented the different available multi-view video channels. Any other viewer 6A watching the same multi-view display 2 will instead continue to watch the same multi-view video channel that he/she was watching prior to the first viewer 6 starting the channel selection procedure.

In another embodiment, also the second viewer 6A will be presented video data of the available multi-view video channels during the channel selection procedure even if it was the first viewer 6 that started the channel selection procedure. In such an embodiment, the view information that is generated by the processor 110 preferably defines, for at least the first pixel area 30, i) the first view 10 of the first multi-view video channel with the view angle projecting the first view 10 of the first multi-view video channel onto the left eye 7 of the first viewer 6, ii) the second view 12 of the first multi-view video channel with the view angle projecting the second view 12 of the first multi-view video channel onto the right eye 8 of the first viewer 6, iii) the first view 20 of the second multi-view video channel with the view angle projecting the first view 20 of the second multi-view video channel onto point in the first direction relative to the left eye 7 of the first viewer 6, and iv) the second view 22 of the second multi-view video channel with the view angle projecting the second view 22 of the second multi-view video channel onto the point in the first direction relative to right eye 8 of the first viewer 6.

The view information preferably also defines, for at least the third pixel area 34, i) the view 11 of the one of the at least first and second multi-view video channel with the view angle projecting the view 11 of the one of the at least first and second multi-view video channel onto the left eye 7A of the second viewer 6A, ii) the another view 13 of the one of the at least first and second multi-view video channel with the view angle projecting the another view 13 of the one of the at least first and second multi-view video channel onto the right eye 8A of the second viewer 6A; iii) a view of the other of the at least first and second multi-view video channel with a view angle projecting the view of the other of the at least first and second multi-view video channel onto a point in the first direction relative to the left eye 7A of the second viewer 6A, and iii) another view of the other of the at least first and second multi-view video channel with a view angle projecting the another view of the other of the at least first and second multi-view video channel onto a point in the first direction relative to the right eye 8A of the second viewer 6A.

Figure 6:
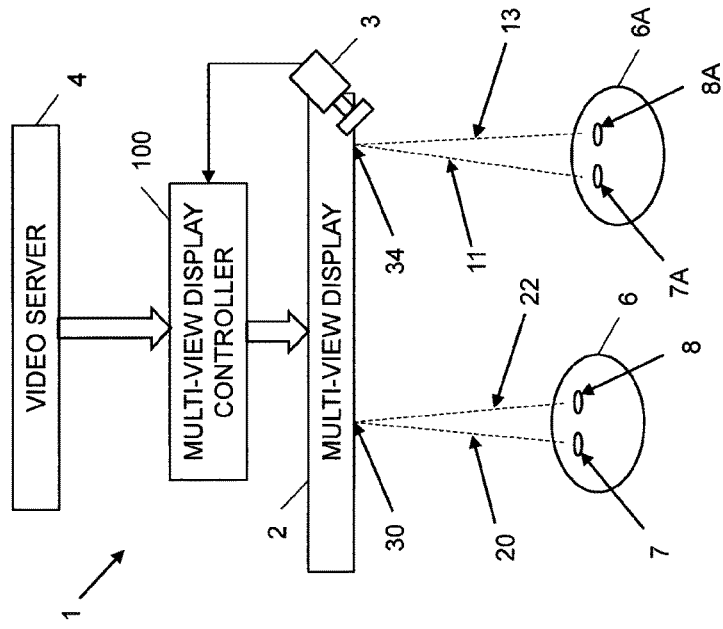
FIG. 6 is a schematic overview of a multi-view display system according to an embodiment following a channel selection procedure.

FIG. 6 illustrates a corresponding situation after a channel selection procedure according to an embodiment. The processor 110 of the multi-view display controller 100 is then operable to generate, upon reception of the channel selection signal and based on the updated position information, updated view information. The updated view information defines, in an embodiment and for the at least first pixel area 30, i) the first view 20 of the selected multi-view video channel with the view angle projecting the first view 20 of the selected multi-view video channel onto the left eye 7 of the first viewer 6, and ii) the second view 22 of the selected multi-view video channel with the view angle projecting the second view 22 of the selected multi-view video channel onto the right eye 8 of the first viewer 6.

The view information preferably also defines, for at least the third pixel area 34, i) the view 11 of the one of the at least first and second multi-view video channel with the view angle projecting the view 11 of the one of the at least first and second multi-view video channel onto the left eye 7A of the second viewer 6A, and ii) the another view 13 of the one of the at least first and second multi-view video channel with the view angle projecting the another view 13 of the one of the at least first and second multi-view video channel onto the right eye 8A of the second viewer 6A.

The processor 110 is also operable to output video data of the selected multi-view video channel and the one of the at least first and second multi-view video channel together with the updated view information to the multi-view display 2 for simultaneous display of the selected multi-view video channel and the one of the at least first and second multi-view video channel.

In this embodiment, the first viewer 6 will watch video data of the multi-view video channel that was selected by the first viewer 6 during the channel selection procedure as shown in FIG. 5. The second viewer 6A will, however, still watch the multi-view video channel that he/she was watching prior to the channel selection procedure and possible also during the channel selection procedure.

Note that the selected multi-view video channel that is presented to the first viewer 6 may be different from or indeed the same as the one of the at least first and second multi-view video channel that is presented to the second viewer 6A.

In another embodiment, the second viewer 6A will be presented the same selected multi-view video channel as the first viewer 6 following the channel selection procedure. Hence, in this embodiment the channel selection as performed by the first viewer 6 affects all viewers 6, 6A, which thereby are presented the same multi-view video channel, but possible different views of this multi-view video channel.

In this other embodiment, the updated view information defines, for the at least first pixel area 30, i) the first view 20 of the selected multi-view video channel with the view angle projecting the first view 20 of the selected multi-view video channel onto the left eye 7 of the first viewer 6, and ii) the second view 22 of the selected multi-view video channel with the view angle projecting the second view 22 of the selected multi-view video channel onto the right eye 8 of the first viewer 6.

The view information preferably also defines, for at least the third pixel area 34, i) a view of the selected multi-view video channel with the view angle projecting the view of the selected multi-view video channel onto the left eye 7A of the second viewer 6A, and ii) another view of the selected multi-view video channel with the view angle projecting the another view of the selected multi-view video channel onto the right eye 8A of the second viewer 6A.

The video data of the alternative multi-view video channels presented to the viewer during the channel selection procedure may be at a same quality level as the video data of the current or first multi-view video channel that the viewer was watching at the start of the channel selection procedure. Alternatively, the alternative multi-view video channels could be presented at a lower quality level.

The multi-view display controller may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Figure 8:
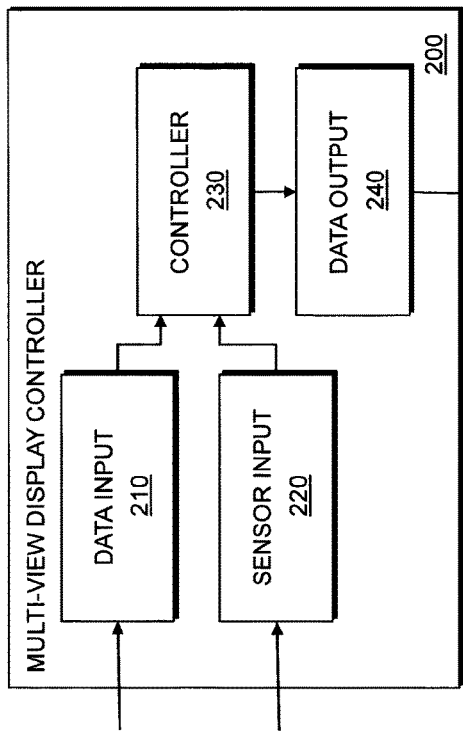
FIG. 8 is a schematic block diagram of a multi-view display controller according to another embodiment.

FIG. 8 illustrates a particular hardware implementation of the multi-view display controller 200. The multi-view display controller 200 comprises, in this embodiment, a data input 210 operable to receive the video data. A sensor input 220 of the multi-view display controller 200 is operable to receive, from the positioning device, the position information. A controller 230 is operable to generate, upon reception of the activation signal and based on the position information, the previously defined view information. The multi-view display controller 200 preferably also comprises a data output 240 operable to output the video data of the first multi-view video channel and the second multi-view video channel together with the view information to the multi-view display for simultaneous display of the first multi-view video channel and the second multi-view video channel.

The data input 210 of the multi-view display controller 200 is preferably or wirelessly connected or connected by wire to the video server to thereby be able to receive video data of the available multi-view video channels. The data input 210 is also connected to the controller 230 to forward the video data to the controller 230. In an embodiment, the data input 210 is also operable to receive the activation signal and/or channel selection signal, such as from the remote control device.

The sensor input 220 is connected to the positioning device and receives the position information therefrom. The sensor input 220 is also connected to the controller 230 to forward the received position information to the controller 230. In an embodiment, the sensor input 220 could be operable to receive the activation signal and/or channel selection signal from the positioning device, if the positioning device is operable to generate these signals based on detection of a predefined movement of a viewer.

The controller 230 is connected to the data output 240 in order to forward the received video data and the generated view information to the data output 240. The data output 240 is in turn connected to the multi-view display for forwarding the information thereto.

Alternatively, the multi-view display controller described herein may be implemented in software such as a computer program for execution by suitable processing circuitry such as one or more processors or processing units.

The flow diagram or diagrams presented in FIGS. 11-17 and further described herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs) or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 9:
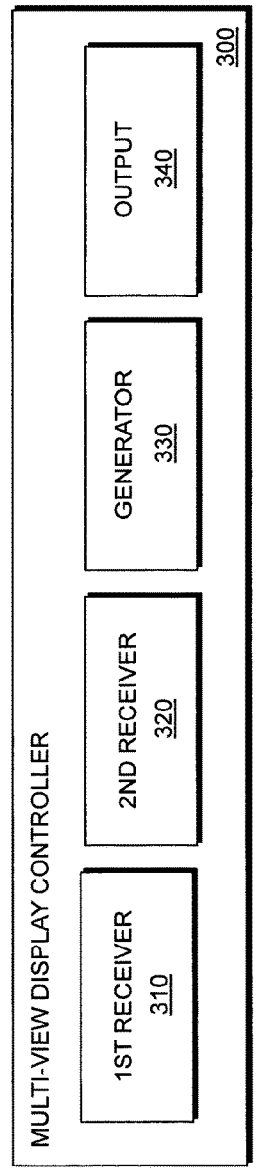
FIG. 9 is a schematic block diagram of a multi-view display controller according to a further embodiment.

FIG. 9 schematically illustrates an implementation embodiment of the multi-view display controller 300 comprising a number of function modules 310-340. The multi-view display controller 300 thereby comprises a first receiver 310, or first receiving module, for receiving video data of at least a first multi-view video channel and a second multi-view video channel. The multi-view display controller 300 also comprises a second receiver 320, or second receiving module, for receiving position information representing positions of a left eye and a right eye of a viewer relative to a multi-view display. The multi-view display controller 300 further comprises a generator 330, or generating module, for generating, upon reception of an activation signal and based on the position information, view information. The view information defines, for at least a first pixel area of the multi-view display, i) a first view of the first multi-view video channel with a view angle projecting the first view of the first multi-view video channel onto the left eye of the viewer, ii) a second view of the first multi-view video channel with a view angle projecting the second view of the first multi-view video angle onto the right eye of the viewer, iii) a first view of the second multi-view video channel with a view angle projecting the first view of the second multi-view video channel onto a point in a first direction relative to the left eye of the viewer, and iv) a second view of the second multi-view video channel with a view angle projecting the second view of the second multi-view video channel onto a point in the first direction relative to the right eye of the viewer. The multi-view display controller 300 additionally comprises an output 340, or output module, for outputting video data of the first multi-view video channel and the second multi-view video channel together with the view information to the multi-view display for simultaneous display of the first multi-view video channel and the second multi-view video channel.

Figure 10:
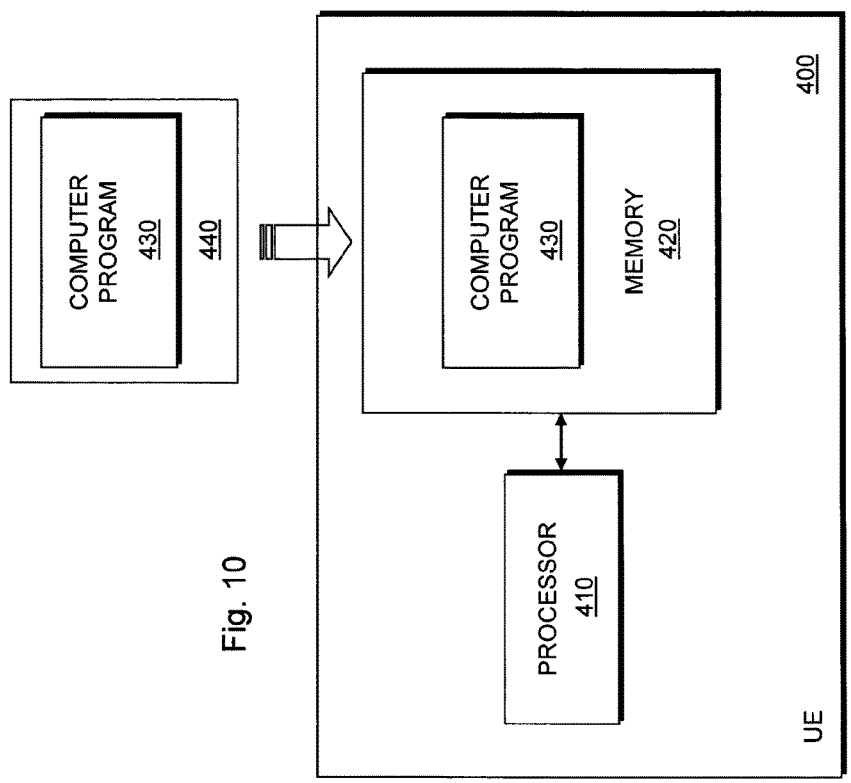
FIG. 10 illustrates a user terminal (UE) according to an embodiment together with a computer program product and computer program according to an embodiment.

In the following, an example of a computer implementation will be described with reference to FIG. 10. The user equipment (UE) 400 comprises processing circuitry such as one or more processors 410 and a memory 420. In this particular example, at least some of the functions of the multi-view video controller described herein are implemented in a computer program 430, which is loaded into the memory 420 for execution by the processor 410. The processor 410 and memory 420 are interconnected to each other to enable normal software execution.

The term 'user equipment' should be interpreted in a general sense as any system or device capable of executing program code or computer program instructions to perform a particular processing, determining or computing task.

In a particular embodiment, the computer program 430 comprises program code, or code means, which when executed by the processor 410 causes the processor 410 to receive video data of at least a first multi-view video channel and a second multi-view video channel. The program code also causes the processor 410 to receive, from a positioning device, position information representing positions of a left eye and a right eye of a viewer relative to a multi-view display. The program code further causes the processor 410 to generate, upon reception of an activation signal and based on the position information, view information. The view information defines, for at least a first pixel area of the multi-view display, i) a first view of the first multi-view video channel with a view angle projecting the first view of the first multi-view video channel onto the left eye of the viewer, ii) a second view of the first multi-view video channel with a view angle projecting the second view of the first multi-view video angle onto the right eye of the viewer, iii) a first view of the second multi-view video channel with a view angle projecting the first view of the second multi-view video channel onto a point in a first direction relative to the left eye of the viewer, and iv) a second view of the second multi-view video channel with a view angle projecting the second view of the second multi-view video channel onto a point in the first direction relative to the right eye of the viewer. The program code additionally causes the processor 410 to output video data of the first multi-view video channel and the second multi-view video channel together with the view information to the multi-view display for simultaneous display of the first multi-view video channel and the second multi-view video channel.

The software or computer program 430 may be realized as a computer program product 440, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Universal Serial Bus (USB), memory, a Hard Disk Drive (HDD) storage device, a flash memory, or any other conventional memory device. The computer program 430 may thus be loaded into the operating memory of a computer or equivalent user equipment 400 for execution by the processor 410 thereof.

Hence, in an embodiment a computer program product 440 comprises computer readable code means and a computer program 430 as defined above stored on the computer readable code means.

The multi-view display 2, see FIGS. 1-6 of the multi-view display system 1 can be any display or screen, such as TV screen, capable of displaying different images or views in different directions. Such multi-view displays 2 are available on the marked and sold, for instance, by Holografika as HoloVizio® screens.

The positioning device 3 of the multi-view display system 1 can be any sensor, camera or other positioning equipment capable of tracking the eyes of a viewer and find the positions of each eye of the viewer. The position device 3 preferably tracks the 3D position of each eye relative to a fixed or predefined reference point, such as a predefined point of the multi-view display 2.

Finding the 3D position of the eye can be accurately done by a sensor, such as the Kinect® sensor used by Xbox® One game console. This sensor creates a high resolution image of the viewer and uses a time-of-flight system to estimate the distance from the sensor in every pixel in the high resolution image. By using face and eye detection the sensor can find the eyes of the viewer in the high resolution image and by using the time-of-flight data the sensor can calculate how far away the eyes are. Hence, the 3D positions of the eyes can be obtained.

There are other sensors and positioning devices available on the marked that use similar or different techniques than the Kinect® sensor in order to be able to generate the position information of the present embodiments.

For instance, special glasses with infrared (IR) reflecting dots on them could be detected and filmed by IR cameras in order to generate the position information.

In FIGS. 1-2, 4-6 the multi-view display system 1 has been illustrated as comprising a single positioning device 3. This is generally sufficient in order to accurately generate the position information. However, it is possible that the multi-view display system 1 comprises two or more positioning devices 3 that collectively can be used in order to provide the position information.

Figure 11:
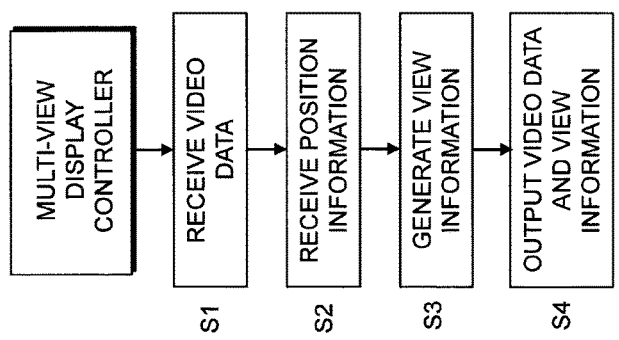
FIG. 11 is a flow chart illustrating a multi-view display control method according to an embodiment.

FIG. 11 is a flow chart illustrating a multi-view display control method according to an embodiment. The multi-view display control method is preferably performed by a multi-view display controller, such as one of the embodiments as shown in FIGS. 7-9, or the user equipment as shown in FIG. 10. The method generally comprises receiving, in step S1, video data of at least a first multi-view video channel and a second multi-view video channel. The method also comprises receiving, in step S2 and from a positioning device, position information representing positions of a left eye and a right eye of a viewer relative to a multi-view display. A following step S3 comprises generating, upon reception of an activation signal and based on the position information received in step S2, view information. This view information defines, as previously disclosed herein, for at least a first pixel area of the multi-view display, i) a first view of the first multi-view video channel with a view angle projecting the first view of the first multi-view video channel onto the left eye of the viewer, ii) a second view of the first multi-view video channel with a view angle projecting the second view of the first multi-view video angle onto the right eye of the viewer, iii) a first view of the second multi-view video channel with a view angle projecting the first view of the second multi-view video channel onto a point in a first direction relative to the left eye of the viewer, and iv) a second view of the second multi-view video channel with a view angle projecting the second view of the second multi-view video channel onto a point in the first direction relative to the right eye of the viewer. The method further comprises outputting, in step S4, video data of the first multi-view video channel and the second multi-view video channel received in step S1 together with the view information generated in step S3 to the multi-view display for simultaneous display of the first multi-view video channel and the second multi-view video channel.

FIG. 12 is a flow chart illustrating additional, optional steps of the method shown in FIG. 11. The method continues from step S4 in FIG. 11. A next step S10 comprises receiving, from the positioning device and following reception of a channel selection signal, updated position information representing updated positions of the left eye and the right eye of the viewer. The method also comprises selecting, in step S11, a multi-view video channel of the at least first multi-view video channel and the second multi-view video channel based on the updated position information. Video data of the multi-view video channel selected in step S11 is output in step S13 to the multi-view display.

FIG. 13 is a flow chart illustrating an additional, optional step of the method shown in FIG. 12. The method continues from step S11 in FIG. 12. A next step S12 comprises generating, upon reception of the channel selection signal and based on the updated position information received in step S10, updated view information. The updated view information defines, for the at least first pixel area, i) a first view of the selected multi-view video channel with a view angle projecting the first view of the selected multi-view video channel onto the left eye of the viewer, and ii) a second view of the selected multi-view video channel with a view angle projecting the second view of the selected multi-view video angle onto the right eye of the viewer.

The method then continues to step S13 in FIG. 12, which comprises outputting the video data of the multi-view video channel selected in step S11 together with the updated view information generated in step S12 to the multi-view display for display of the selected multi-view video channel.

In an embodiment, step S3 of FIG. 11 comprises generating, upon reception of the activation signal and based on the position information, view information defining, for the first pixel area, i) the first view of the first multi-view video channel with the view angle projecting the first view of the first multi-view video channel onto the left eye of the viewer, ii) the second view of the first multi-view video channel with the view angle projecting the second view of the first multi-view video angle onto the right eye of the viewer, iii) the first view of the second multi-view video channel with the view angle projecting the first view of the second multi-view video channel onto the point in the first direction relative to the left eye of the viewer, and iv) the second view of the second multi-view video channel with the view angle projecting the second view of the second multi-view video channel onto the point in the first direction relative to the right eye of the viewer. The view information generated in step S3 also defines, for a second pixel area of the multi-view display, i) a third view of the first multi-view video channel with a view angle projecting the third view of the first multi-view video channel onto the left eye of the viewer, ii) a fourth view of the first multi-view video channel with a view angle projecting the fourth view of the first multi-view video angle onto the right eye of the viewer, iii) a third view of the second multi-view video channel with a view angle projecting the third view of the second multi-view video channel onto the point in the first direction relative to the left eye of the viewer, and iv) a fourth view of the second multi-view video channel with a view angle projecting the fourth view of the second multi-view video channel onto the point in the first direction relative to the right eye of the viewer.

FIG. 14 is a flow chart illustrating an additional, optional step of the method shown in FIG. 11. The method continues from step S2 in FIG. 11. A next step S20 comprises calculating the view angles based on a respective depth of the left eye and the right eye of the viewer relative to the multi-view display and a respective distance of the left eye and the right eye of the viewer in a direction parallel to the first direction relative to a predefined point on the multi-view display. The depths and distances are obtained based on the position information received in step S2. The method then continues to step S3 in FIG. 11.

FIG. 15 is a flow chart illustrating an additional, optional step of the method shown in FIG. 11. The method continues from step S2 in FIG. 11. A next step S30 comprises determining, based on the position information, a respective depth of the left eye and the right eye of the viewer relative to the multi-view display. Step S30 also comprises determining a respective distance of the left eye and the right eye of the viewer in a direction parallel to the first direction relative to a predefined point on the multi-view video display. The method then continues to step S3 in FIG. 11 where the view information is generated upon reception of the activation signal and based on the depth and the distance of the left eye of the viewer and the depth and the distance of the right eye of the viewer.

In a particular embodiment, the view information generated in step S3 of FIG. 11 defines, for each pixel column of the multi-view display, at least one view for each multi-view video channel of multiple multi-view video channels with a respective view angle. In this embodiment, a view angle for a view of a multi-view video channel of the multiple multi-view video channels for a first pixel column of the multi-view display is a same as a view angle for another view of the multi-view video channel for a second pixel column of the multi-view display.

FIG. 16 is a flow chart illustrating an additional, optional step of the method shown in FIG. 11. The method continues from step S1 in FIG. 11. A next step S40 comprises outputting, prior to reception of the activation signal, video data of the first multi-view video channel to the multi-view display.

In a particular embodiment, step S3 of FIG. 11 comprises generating initial view information. The initial view information defines, for at least the first pixel area, i) the first view of the first multi-view video channel with the view angle projecting the first view of the first multi-view video channel onto the left eye of the first viewer, and ii) the second view of the first multi-view video channel with the view angle projecting the second view of the first multi-view video channel onto the right eye of the first viewer. The initial view information preferably also defines, for at least a third pixel area of the multi-view display, i) a view of one of the at least first and second multi-view video channel with a view angle projecting the view of the one of the at least first and second multi-view video channel onto the left eye of the second viewer, and ii) another view of the one of the at least first and second multi-view video channel with a view angle projecting the another view of the one of the at least first and second multi-view video channel onto the right eye of the second viewer. In this embodiment, step S4 preferably comprises outputting video data of the first multi-view video channel and the one of the at least first and second multi-view video channel together with the initial view information to the multi-view display for simultaneous display of the first multi-view video channel and the one of the at least first and second multi-view video channel.

The initial view information generated in step S3 could be generated based on first and second position information as received from the positioning device or based on pre-defined view angles as previously discussed herein.

In another particular embodiment, step S2 of FIG. 11 comprises receiving, form the positioning device, first position information representing positions of a left eye and a right eye of a first viewer relative to the multi-view display and second position information representing positions of a left eye and a right eye of a second viewer relative to the multi-view display. In this embodiment, the view information is generated in step S3, upon reception of the activation signal, based on the first position information and the second position information. The view information defines, for at least the first pixel area, i) the first view of the first multi-view video channel with the view angle projecting the first view of the first multi-view video channel onto the left eye of the first viewer, ii) the second view of the first multi-view video channel with the view angle projecting the second view of the first multi-view video angle onto the right eye of the first viewer, iii) the first view of the second multi-view video channel with the view angle projecting the first view of the second multi-view video channel onto the point in a first direction relative to the left eye of the first viewer, and iv) the second view of the second multi-view video channel with the view angle projecting the second view of the second multi-view video channel onto the point in the first direction relative to the right eye of the first viewer. The view information also defines, for the at least third pixel area, i) the view of the one of the at least first and second multi-view video channel with the view angle projecting the view of the one of the at least first and second multi-view video channel onto the left eye of the second viewer, and ii) the another view of the one of the at least first and second multi-view video channel with the view angle projecting the another view of the one of the at least first and second multi-view video channel onto the right eye of the second viewer. In this embodiment, step S4 preferably comprises outputting video data of the first multi-view video channel and the second multi-view video channel together with the view information to the multi-view display for simultaneous display of the first multi-view video channel and the second multi-view video channel.

In another variant of this embodiment, the view information defines, for at least the first pixel area, i) the first view of the first multi-view video channel with the view angle projecting the first view of the first multi-view video channel onto the left eye of the first viewer, ii) the second view of the first multi-view video channel with the view angle projecting the second view of the first multi-view video angle onto the right eye of the first viewer, iii) the first view of the second multi-view video channel with the view angle projecting the first view of the second multi-view video channel onto the point in the first direction relative to the left eye of the first viewer, and iv) the second view of the second multi-view video channel with the view angle projecting the second view of the second multi-view video channel onto the point in the first direction relative to the right eye of the first viewer. The view information also defines, for the at least third pixel area, i) the view of the one of the at least first and second multi-view video channel with the view angle projecting the view of the one of the at least first and second multi-view video channel onto the left eye of the second viewer, ii) the another view of the one of the at least first and second multi-view video channel with the view angle projecting the another view of the one of the at least first and second multi-view video channel onto the right eye of the second viewer, iii) a view of the other of the at least first and second multi-view video channel with a view angle projecting the view of the other of the at least first and second multi-view video channel onto a point the first direction relative to the left eye of the second viewer, iv) another view of the other of the at least first and second multi-view video channel with a view angle projecting the another view of the other of the at least first and second multi-view video channel onto a point in the first direction relative to the right eye of the second viewer, In a further particular embodiment, the updated view information generated in step S12 of FIG. 13 defines, for the at least first pixel area, i) the first view of the selected multi-view video channel with the view angle projecting the first view of the selected multi-view video channel onto the left eye of the first viewer, and ii) the second view of the selected multi-view video channel with the view angle projecting the second view of the selected multi-view video angle onto the right eye of the first viewer. The updated view information also defines, for the at least third pixel area, i) the view of the one of the at least first and second multi-view video channel with the view angle projecting the view of the one of the at least first and second multi-view video channel onto the left eye of the second viewer, and ii) the another view of the one of the at least first and second multi-view video channel with the view angle projecting the another view of the one of the at least first and second multi-view video channel onto the right eye of the second viewer.

The method then continues to step S13 of FIG. 11, which comprises outputting the video data of the selected multi-view video channel and the one of the at least first and second multi-view video channel together with the updated view information to the multi-view display for simultaneous display of the selected multi-view video channel and the one of the at least first and second multi-view video channel.

In another variant of this embodiment, the updated view information defines, for the at least first pixel area, i) the first view of the selected multi-view video channel with the view angle projecting the first view of the selected multi-view video channel onto the left eye of the first viewer, and ii) the second view of the selected multi-view video channel with the view angle projecting the second view of the selected multi-view video angle onto the right eye of the first viewer. The updated view information also defines, for the at least third pixel area, a view of the selected multi-view video channel with a view angle projecting the view of the selected multi-view video channel onto the left eye of the second viewer, and ii) another view of the selected multi-view video channel with a view angle projecting the another view of the selected multi-view video angle onto the right eye of the second viewer.

The method then continues to step S13 of FIG. 11, which comprises outputting the video data of the selected multi-view video channel together with the updated view information to the multi-view display for simultaneous display of the selected multi-view video channel.

FIG. 17 is a flow chart illustrating a multi-view display control method according to another embodiment. In this method the multi-view video controller receives video data of multiple multi-view video or TV channels from a video server or other video data providing entity. The multi-view display controller awaits reception of any activation signal that triggers a channel selection procedure. If it does not receive any such activation signal it outputs video data of a current multi-view video channel to the multi-view display to thereby be displayed to the watching viewer. In addition to the video data, the multi-view controller preferably also outputs initial view information. The initial view information defines, for at least one pixel area of the multi-view display but preferably for each of multiple such pixel areas, i) a respective view of the current multi-view video channel with a respective view angle projecting the view onto the left eye of the viewer, and ii) another respective view of the current multi-view video channel with a respective view angle projecting the another view onto the right eye of the viewer. The initial view information is thereby used by the multi-view display to determine which particular views to be displayed at which view angles for the different pixel areas, such as pixel columns, of the multi-view display. At this point the viewer is thereby able to watch a 3D video channel.

If the multi-view display controller, however, receives the activation signal, such as from a remote control device, the positioning device or a microphone, the multi-view video controller additionally receives position information from the positioning device and wherein this position information represents or defines positions of the left and right eye of a viewer relative to a multi-view display. It generates view information based on the current, i.e. latest received, position information. The view information defines, as discussed in the foregoing, not only the views and view angles of the current multi-view video channel but also views and view angles for the other available multi-view video channels. The view angles for these other multi-view video angles are thereby selected, based on the position information, to enable the viewer to see video data for these other multi-view video channels by moving the head slightly from the current position.

The multi-view video controller outputs video data of the multiple multi-view video channels together with the generated view information to the multi-view display for simultaneous display of the multiple multi-view video channels during the channel selection procedure. The multi-view display continues to display these multiple multi-view video channels until the multi-view display controller receives the selection signal, such as from the remote control device or the positioning device.

When the multi-view display controller receives the channel selection signal it selects, based on updated position information reflecting updated or new positions of the eyes of viewer, an updated or new multi-view video channel among the available multi-view video channels. Video data of this selected multi-view video channel is output to the multi-view display preferably with updated view information defining respective views and view angles for the selected multi-view video channel. At this point the viewer is able to watch the selected multi-view video channel with a 3D experience.

The embodiments described above are to be understood as a few illustrative examples of the present invention. It will be understood by those skilled in the art that various modifications, combinations and changes may be made to the embodiments without departing from the scope of the present technology. In particular, different part solutions in the different embodiments can be combined in other configurations, where technically possible. The scope of the present technology is, however, defined by the appended claims.

The invention claimed is:

1. A multi-view display controller comprising:
a processor; and
a memory, wherein said processor is operable to:
receive video data of at least a first multi-view video channel and a second multi-view video channel;
receive, from a positioning device, position information representing positions of a left eye and a right eye of a viewer relative to a multi-view display;
generate, upon reception of an activation signal and based on said position information, view information defining, for at least a first pixel area of said multi-view display, i) a first view of said first multi-view video channel with a view angle projecting said first view of said first multi-view video channel onto said left eye of said viewer, ii) a second view of said first multi-view video channel with a view angle projecting said second view of said first multi-view video channel onto said right eye of said viewer, iii) a first view of said second multi-view video channel with a view angle projecting said first view of said second multi-view video channel onto a point in a first direction relative to said left eye of said viewer, and iv) a second view of said second multi-view video channel with a view angle projecting said second view of said second multi-view video channel onto a point in said first direction relative to said right eye of said viewer; and output video data of said first multi-view video channel and said second multi-view video channel together with said view information to said multi-view display for simultaneous display of said first multi-view video channel and said second multi-view video channel.

2. The multi-view display controller according to claim 1, wherein said processor is operable to receive said activation signal from a remote control device.

3. The multi-view display controller according to claim 1, wherein said processor is operable to receive said activation signal from said positioning device based on detection, by said positioning device, of a predefined movement of said viewer.

4. The multi-view display controller according to claim 3, wherein said processor is operable to:
generate, upon reception of said channel selection signal and based on said updated position information, updated view information defining, for said at least first pixel area, i) a first view of said selected multi-view video channel with a view angle projecting said first view of said selected multi-view video channel onto said left eye of said viewer, and ii) a second view of said selected multi-view video channel with a view angle projecting said second view of said selected multi-view video channel onto said right eye of said viewer; and
output said video data of said selected multi-view channel together with said updated view information to said multi-view display for display of said selected multi-view video channel.

5. The multi-view display controller according to claim 1, wherein said processor is operable to:
receive, from said positioning device and following reception of a channel selection signal, updated position information representing updated positions of said left eye and said right eye of said viewer;
select a multi-view video channel of said at least first multi-view video channel and second multi-view video channel based on said updated position information; and
output video data of said selected multi-view video channel to said multi-view display.

6. The multi-view display controller according to claim 1, wherein said processor is operable to generate, upon reception of said activation signal and based on said position information, said view information defining:
a), for said first pixel area, i) said first view of said first multi-view video channel with said view angle projecting said first view of said first multi-view video channel onto said left eye of said viewer, ii) said second view of said first multi-view video channel with said view angle projecting said second view of said first multi-view video channel onto said right eye of said viewer, iii) said first view of said second multi-view video channel with said view angle projecting said first view of said second multi-view video channel onto said point in said first direction relative to said left eye of said viewer, and iv) said second view of said second multi-view video channel with said view angle projecting said second view of said second multi-view video channel onto said point in said first direction relative to said right eye of said viewer; and b), for a second pixel area of said multi-view display, i) a third view of said first multi-view video channel with a view angle projecting said third view of said first multi-view video channel onto said left eye of said viewer, ii) a fourth view of said first multi-view video channel with a view angle projecting said fourth view of said first multi-view video channel onto said right eye of said viewer, iii) a third view of said second multi-view video channel with a view angle projecting said third view of said second multi-view video channel onto said point in said first direction relative to said left eye of said viewer, and iv) a fourth view of said second multi-view video channel with a view angle projecting said fourth view of said second multi-view video channel onto said point in said first direction relative to said right eye of said viewer.

7. The multi-view display controller according to claim 1, wherein said processor is operable to calculate said view angles based on a respective depth of said left eye and said right eye of said viewer relative to said multi-view display and a respective distance of said left eye and said right eye of said viewer in a direction parallel to said first direction relative to a predefined point on said multi-view display, wherein said depths and said distances are obtained based on said position information.

8. The multi-view display controller according to claim 1, wherein said processor is operable to:
determine, based on said position information, a respective depth of said left eye and said right eye of said viewer relative to said multi-view display and a respective distance of said left eye and said right eye of said viewer in a direction parallel to said first direction relative to a predefined point on said multi-view display; and
generate, upon reception of said activation signal, said view information based on said depth and said distance of said left eye of said viewer and said depth and said distance of said right eye of said viewer.

9. The multi-view display controller according to claim 1, wherein said processor is operable to generate, upon on reception of said activation signal and based on said position information, said view information defining, for each pixel column of said multi-view display, at least one view for each multi-view video channel of multiple multi-view video channels with a respective view angle, wherein a view angle for a view of a multi-view video channel of said multiple multi-view video channels for a first pixel column of said multi-view display is a same as a view angle for another view of said multi-view video channel for a second pixel column of said multi-view display.

10. The multi-view display controller according to claim 1, wherein said processor is operable to output, prior to reception of said activation signal, video data of said first multi-view video channel to said multi-view display.

11. The multi-view display controller according to claim 1, wherein said processor is operable to:
generate, prior to reception of said activation signal, initial view information defining;
a), for at least said first pixel area, i) said first view of said first multi-view video channel with said view angle projecting said first view of said first multi-view video channel onto a left eye of a first viewer, and ii) said second view of said first multi-view video channel with said view angle projecting said second view of said first multi-view video channel onto a right eye of said first viewer (6), and
- b), for at least a third pixel area of said multi-view display, i) a view of one of said at least first and second multi-view video channel with a view angle projecting said view of said one of said at least first and second multi-view video channel onto a left eye of a second viewer; and ii) another view of said one of said at least first and second multi-view video channel with a view angle projecting said another view of said one of said at least first and second multi-view video channel onto a right eye of said second viewer; and output video data of said first multi-view video channel and said one of said at least first and second multi-view video channel together with said initial view information to said multi-view display for simultaneous display of said first multi-view video channel and said one of said at least first and second multi-view video channel.

12. The multi-view display controller according to claim 11, wherein said processor is operable to:
- receive, from said positioning device, first position information representing positions of said left eye and said right eye of said first viewer relative to said multi-view display and second position information representing positions of said left eye and said right eye of said second viewer relative to said multi-view display;
- generate, upon reception of said activation signal and based on said first position information and said second information, said view information defining;
- a) for at least said first pixel area, i) said first view of said first multi-view video channel with said view angle projecting said first view of said first multi-view video channel onto said left eye of said first viewer, ii) said second view of said first multi-view video channel with said view angle projecting said second view of said first multi-view video channel onto said right eye of said first viewer, iii) said first view of said second multi-view video channel with said view angle projecting said first view of said second multi-view video channel onto said point in said first direction relative to said left eye of said first viewer, and iv) said second view of said second multi-view video channel with said view angle projecting said second view of said second multi-view video channel onto said point in said first direction relative to said right eye of said first viewer, and
- b), for at least said third pixel area, i) said view of said one of said at least first and second multi-view video channel with said view angle projecting said view of said one of said at least first and second multi-view video channel onto said left eye of said second viewer; and ii) another view of said one of said at least first and second multi-view video channel with said view angle projecting said another view of said one of said at least first and second multi-view video channel onto said right eye of said second viewer; and output video data of said first multi-view video channel and said second multi-view video channel together with said view information to said multi-view display for simultaneous display of said first multi-view video channel and said second multi-view video channel.

13. The multi-view display controller according to claim 1, further comprising:
- a data input operable to receive said video data;
- a sensor input operable to receive, from said positioning device, said position information;
- a controller operable to generate, upon reception of said activation signal and based on said position information, said view information; and
- a data output operable to output said video data of said first multi-view video channel and said second multi-view video channel together with said view information to said multi-view display for simultaneous display of said first multi-view video channel and said second multi-view video channel.

14. A multi-view display system comprising:
- a multi-view display controller according to claim 1;
- a multi-view display connectable to said multi-view display controller; and
- a positioning device operable to generate position information representing positions of a left eye and a right eye of a viewer relative to said multi-view display and connectable to said multi-view display controller.

15. The multi-view display system according to claim 14, further comprising a video server operable to provide video data of at least a first multi-view video channel and a second multi-view video channel and connectable to said multi-view display controller.

16. A computer program stored on a non-transitory computer readable medium, the computer program comprising program code which when executed by a processor causes said processor to:
- receive video data of at least a first multi-view video channel and a second multi-view video channel;
- receive, from a positioning device, position information representing positions of a left eye and a right eye of a viewer relative to a multi-view display;
- generate, upon reception of an activation signal and based on said position information, view information defining, for at least a first pixel area of said multi-view display, i) a first view of said first multi-view video channel with a view angle projecting said first view of said first multi-view video channel onto said left eye of said viewer, ii) a second view of said first multi-view video channel with a view angle projecting said second view of said first multi-view video channel onto said right eye of said viewer, iii) a first view of said second multi-view video channel with a view angle projecting said first view of said second multi-view video channel onto a point in a first direction relative to said left eye of said viewer, and iv) a second view of said second multi-view video channel with a view angle projecting said second view of said second multi-view video channel onto a point in said first direction relative to said right eye of said viewer; and
- output video data of said first multi-view video channel and said second multi-view video channel together with said view information to said multi-view display for simultaneous display of said first multi-view video channel and said second multi-view video channel.

17. A multi-view display control method comprising:
- receiving video data of at least a first multi-view video channel and a second multi-view video channel;
- receiving, from a positioning device, position information representing positions of a left eye and a right eye of a viewer relative to a multi-view display;
- generating, upon reception of an activation signal and based on said position information, view information defining, for at least a first pixel area of said multi-view display, i) a first view of said first multi-view video channel with a view angle projecting said first view of said first multi-view video channel onto said left eye of said viewer, ii) a second view of said first multi-view video channel with a view angle projecting said second view of said first multi-view video channel onto said right eye of said viewer, iii) a first view of said second multi-view video channel with a view angle projecting said first view of said second multi-view video channel onto a point in a first direction relative to said left eye of said viewer, and iv) a second view of said second multi-view video channel with a view angle projecting said second view of said second multi-view video channel onto a point in said first direction relative to said right eye of said viewer; and outputting video data of said first multi-view video channel and said second multi-view video channel together with said view information to said multi-view display for simultaneous display of said first multi-view video channel and said second multi-view video channel.

18. The multi-view display control method according to claim 17, further comprising:

receiving, from said positioning device and following reception of a channel selection signal, updated position information representing updated positions of said left eye and said right eye of said viewer;

selecting a multi-view video channel of said at least first multi-view video channel and second multi-view video channel based on said updated position information; and outputting video data of said selected multi-view video channel to said multi-view display.

19. The multi-view display control method according to claim 18, further comprising generating, upon reception of said channel selection signal and based on said updated position information, updated view information defining, for said at least first pixel area, i) a first view of said selected multi-view video channel with a view angle projecting said first view of said selected multi-view video channel onto said left eye of said viewer, and ii) a second view of said selected multi-view video channel with a view angle projecting said second view of said selected multi-view video channel onto said right eye of said viewer, wherein outputting said video data comprises outputting said video data of said selected multi-view video channel together with said updated view information to said multi-view display for display of said selected multi-view video channel.

20. The multi-view display control method according to claim 17, wherein generating said view information comprises generating, upon reception of said activation signal and based on said position information, said view information defining a), for said first pixel area, i) said first view of said first multi-view video channel with said view angle projecting said first view of said first multi-view video channel onto said left eye of said viewer, ii) said second view of said first multi-view video channel with said view angle projecting said second view of said first multi-view video channel onto said right eye of said viewer, iii) said first view of said second multi-view video channel with said view angle projecting said first view of said second multi-view video channel onto said point in said first direction relative to said left eye of said viewer, and iv) said second view of said second multi-view video channel with said view angle projecting said second view of said second multi-view video channel onto said point in said first direction relative to said right eye of said viewer, and b), for a second pixel area of said multi-view display, i) a third view of said first multi-view video channel with a view angle projecting said third view of said first multi-view video channel onto said left eye of said viewer, ii) a fourth view of said first multi-view video channel with a view angle projecting said fourth view of said first multi-view video channel onto said right eye of said viewer, iii) a third view of said second multi-view video channel with a view angle projecting said third view of said second multi-view video channel onto said point in said first direction relative to said left eye of said viewer, and iv) a fourth view of said second multi-view video channel with a view angle projecting said fourth view of said second multi-view video channel onto said point in said first direction relative to said right eye of said viewer.

21. The multi-view display control method according to claim 17, further comprising calculating said view angles based on a respective depth of said left eye and said right eye of said viewer relative to said multi-view display and a respective distance of said left eye and said right eye of said viewer in a direction parallel to said first direction relative to a predefined point on said multi-view display as obtained based on said position information.

22. The multi-view display control method according to claim 17, further comprising determining, based on said position information, a respective depth of said left eye and said right eye of said viewer relative to said multi-view display and a respective distance of said left eye and said right eye of said viewer in a direction parallel to said first direction relative to a predefined point on said multi-view video display, wherein generating said view information comprises generating, upon reception of said activation signal, said view information based on said depth and said distance of said left eye of said viewer and said depth and said distance of said right eye of said viewer.

23. The multi-view display control method according to claim 17, further comprising outputting, prior to reception of said activation signal, video data of said first multi-view video channel to said multi-view display.

* * * * *